United States Patent
Gundrum et al.

(10) Patent No.: US 10,090,071 B2
(45) Date of Patent: Oct. 2, 2018

(54) SYSTEMS AND METHODS FOR DISPOSING OF ONE OR MORE RADIOACTIVE COMPONENTS FROM NUCLEAR REACTORS OF NUCLEAR PLANTS

(71) Applicants: Michael Joseph Gundrum, Wilmington, NC (US); Chris Swick, Wilmington, NC (US); Joseph Capobianco, Wilmington, NC (US)

(72) Inventors: Michael Joseph Gundrum, Wilmington, NC (US); Chris Swick, Wilmington, NC (US); Joseph Capobianco, Wilmington, NC (US)

(73) Assignee: GE-HITACHI NUCLEAR ENERGY AMERICAS LLC, Wilmington, NC (US)

( * ) Notice: Subject to any disclaimer, the term of this patent is extended or adjusted under 35 U.S.C. 154(b) by 901 days.

(21) Appl. No.: 13/729,646

(22) Filed: Dec. 28, 2012

(65) Prior Publication Data

US 2014/0185728 A1 Jul. 3, 2014

(51) Int. Cl.
| | |
|---|---|
| *G21C 19/20* | (2006.01) |
| *G21C 19/32* | (2006.01) |
| *G21C 17/10* | (2006.01) |

(52) U.S. Cl.
CPC ............. *G21C 19/32* (2013.01); *G21C 19/20* (2013.01); *G21C 17/10* (2013.01)

(58) Field of Classification Search
CPC ........ G21C 19/20; G21C 17/10; G21C 19/32; G21C 19/34; G21C 19/37
(Continued)

(56) References Cited

U.S. PATENT DOCUMENTS

| | | | | |
|---|---|---|---|---|
| 4,223,581 A | * | 9/1980 | Markiewicz | ........... B23D 23/00 |
| | | | | 376/260 |
| 4,664,872 A | | 5/1987 | Kiewitz et al. | |
| | | (Continued) | | |

FOREIGN PATENT DOCUMENTS

| | | | | |
|---|---|---|---|---|
| DE | 3935645 A1 | * | 5/1991 | ........... B23D 31/008 |
| EP | 0116822 B1 | | 8/1984 | |
| | (Continued) | | | |

OTHER PUBLICATIONS

International Search Report and Written Opinion issued in connection with corresponding PCT Application No. PCT/US2013/073965 dated Sep. 26, 2014.
Japanese Office Action dated Oct. 24, 2017 issued in corresponding Japanese Application No. 2015-550427. (with translation).

*Primary Examiner* — Jack W Keith
*Assistant Examiner* — Lily C Garner
(74) *Attorney, Agent, or Firm* — Harness, Dickey & Pierce, PLC

(57) ABSTRACT

A system for disposing of one or more radioactive components from a nuclear reactor may include a first receptacle configured to receive the one or more radioactive components, a frame configured to support the first receptacle in the nuclear reactor, and a device configured to separate the one or more radioactive components into two or more portions during lowering of the one or more radioactive components into the first receptacle. A method for disposing of one or more radioactive components from a nuclear reactor may include assembling a system for disposing of the one or more radioactive components, and moving the assembled system to an area of a reactor core. A method for disposing of one or more radioactive components from a nuclear reactor may include assembling a system for disposing of the one or more radioactive components in an area of a reactor core.

21 Claims, 21 Drawing Sheets

(58) Field of Classification Search
USPC .......................................................... 376/260
See application file for complete search history.

(56) References Cited

U.S. PATENT DOCUMENTS

| | | | | |
|---|---|---|---|---|
| 5,084,231 A * | 1/1992 | Dixon | ..................... | G21C 19/16 |
| | | | | 376/271 |
| 5,227,123 A * | 7/1993 | Baversten | ............ | G21C 19/207 |
| | | | | 376/260 |
| 6,256,363 B1 * | 7/2001 | Methling | ................ | G21F 5/012 |
| | | | | 250/507.1 |

FOREIGN PATENT DOCUMENTS

| | | |
|---|---|---|
| EP | 0411841 B1 | 2/1991 |
| JP | S-55-122197 A | 9/1980 |
| JP | S-59-137893 | 8/1984 |
| JP | S-60-144695 A | 7/1985 |
| JP | H-0333239 B2 | 5/1991 |
| JP | H-03142399 A | 6/1991 |
| JP | H-05-100091 A | 4/1993 |
| JP | H-06-308279 A | 11/1994 |
| JP | 2000-46983 A | 2/2000 |
| JP | 2003-287591 A | 10/2003 |
| JP | 2008-85340 A | 8/2008 |
| KR | 20120019853 A | 3/2012 |

\* cited by examiner

SYSTEMS AND METHODS FOR DISPOSING OF ONE OR MORE RADIOACTIVE COMPONENTS FROM NUCLEAR REACTORS OF NUCLEAR PLANTS

BACKGROUND

1. Field

Example embodiments generally relate to systems and methods for disposing of one or more radioactive components from nuclear reactors of nuclear plants. Example embodiments also relate to systems and methods for disposing of one or more radioactive components from Boiling Water Reactor ("BWR") nuclear plants. The systems and methods may be particularly beneficial in reducing critical path time during a plant outage (e.g., refueling outage), reducing or eliminating the need for substantially horizontal transfer of the one or more radioactive components, and/or reducing radiation exposure to personnel related to the systems and methods for disposing of one or more radioactive components. The systems and methods also may be used in other types of nuclear plants whose nomenclatures and precise functions may depend on the specific type(s) and/or manufacture(s) of the nuclear plants.

2. Description of Related Art

FIG. 1 is a sectional view, with parts cut away, of reactor pressure vessel ("RPV") 100 in a related art BWR. During operation of the BWR, coolant water circulating inside RPV 100 may be heated by nuclear fission produced in core 102. Feedwater may be admitted into RPV 100 via feedwater inlet 104 and feedwater sparger 106 (a ring-shaped pipe that includes apertures for circumferentially distributing the feedwater inside RPV 100). The feedwater from feedwater sparger 106 may flow down through downcomer annulus 108 (an annular region between RPV 100 and core shroud 110).

Core shroud 110 may be a stainless steel cylinder that surrounds core 102. Core 102 may include a multiplicity of fuel bundle assemblies 112 (two 2×2 arrays, for example, are shown in FIG. 1). Each array of fuel bundle assemblies 112 may be supported at or near its top by top guide 114 and/or at or near its bottom by core plate 116. Top guide 114 may provide lateral support for the top of fuel bundle assemblies 112 and/or may maintain correct fuel-channel spacing to permit control rod insertion.

The coolant water may flow downward through downcomer annulus 108 and/or into core lower plenum 118. The coolant water in core lower plenum 118 may in turn flow up through core 102. The coolant water may enter fuel assemblies 112, wherein a boiling boundary layer may be established. A mixture of water and steam may exit core 102 and/or may enter core upper plenum 120 under shroud head 122. Core upper plenum 120 may provide standoff between the steam-water mixture exiting core 102 and entering standpipes 124. Standpipes 124 may be disposed atop shroud head 122 and in fluid communication with core upper plenum 120.

The steam-water mixture may flow through standpipes 124 and/or may enter steam separators 126 (which may be, for example, of the axial-flow, centrifugal type). Steam separators 126 may substantially separate the steam-water mixture into liquid water and steam. The separated liquid water may mix with feedwater in mixing plenum 128. This mixture then may return to core 102 via downcomer annulus 108. The separated steam may pass through steam dryers 130 and/or may enter steam dome 132. The dried steam may be withdrawn from RPV 100 via steam outlet 134 for use in turbines and other equipment (not shown).

The BWR also may include a coolant recirculation system that provides the forced convection flow through core 102 necessary to attain the required power density. A portion of the water may be sucked from the lower end of downcomer annulus 108 via recirculation water outlet 136 and/or may be forced by a centrifugal recirculation pump (not shown) into a plurality of jet pump assemblies 138 (only one of which is shown) via recirculation water inlets 140. Jet pump assemblies 138 may be circumferentially distributed around core shroud 110 and/or may provide the required reactor core flow.

As shown in FIG. 1, a related art jet pump assembly 138 may include a pair of inlet mixers 142. A related art BWR may include 16 to 24 inlet mixers 142. Each inlet mixer 142 may have an elbow 144 welded to it that receives water from a recirculation pump (not shown) via inlet riser 146. An example inlet mixer 142 may include a set of five nozzles circumferentially distributed at equal angles about the axis of inlet mixer 142. Each nozzle may be tapered radially inwardly at its outlet. Jet pump assembly 138 may be energized by these convergent nozzles. Five secondary inlet openings may be radially outside of the nozzle exits. Therefore, as jets of water exit the nozzles, water from downcomer annulus 108 may be drawn into inlet mixer 142 via the secondary inlet openings, where it may be mixed with coolant water from the recirculation pump. The coolant water then may flow into diffuser 148.

FIG. 2 is a top plan view of a core 200 in a related art BWR. Core 200 may include fuel bundles 202, peripheral fuel bundles 204, and/or control rods 206. Two or more of fuel bundles 202 may be included in fuel bundle assemblies 208. Core 200 may include, for example, hundreds or thousands of fuel bundles 202 and/or tens or hundreds of peripheral fuel bundles 204. As shown in FIG. 2, for example, core 200 may include approximately one thousand and twenty-eight (1,028) fuel bundles 202, approximately one hundred and four (104) peripheral fuel bundles 204, and/or approximately two hundred and sixty-nine (269) control rods 206.

The distribution of fuel bundles 202, peripheral fuel bundles 204, and/or control rods 206 in core 200 may or may not be symmetric. Additionally, if symmetry exists, it may include one or more of mirror-image symmetry, diagonal symmetry, rotational symmetry, translational symmetry, quadrant symmetry, and octant symmetry. As shown in FIG. 2, for example, one or more control rods 206 may be disposed in or near a geometric center of core 200.

Core 200 also may include one or more types of neutron monitors. These monitors may include, for example, one or more source range monitors, one or more intermediate range monitors, and/or one or more power range monitors. In a related art BWR, the one or more source range monitors may be fixed or movable. Similarly, in a related art BWR, the one or more intermediate range monitors may be fixed or movable.

At least some of the overall range of a related art source range monitor ("SRM") and/or a related art intermediate range monitor ("IRM") may be covered by a startup range neutron monitor ("SRNM") or wide range neutron monitor ("WRNM"). Similarly, at least some of the overall range of a related art intermediate range monitor and/or a related art power range monitor ("PRM") may be covered by a local power range monitor ("LPRM"). In a related art BWR, the SRNMs and/or the LPRMs may be fixed.

Core 200 may include, for example, tens of SRNM detectors and/or tens or hundreds of LPRM detectors. Although not shown in FIG. 2, core 200 may include, for example, approximately twelve (12) SRNM detectors. As shown in FIG. 2, for example, core 200 may include approximately two hundred and fifty-six (256) LPRM detectors in approximately sixty-four (64) LPRM assemblies 210. For example, one or more LPRM assemblies 210 may include four LPRM detectors (i.e., each LPRM assembly 210 may include four LPRM detectors).

FIG. 3 is a simplified schematic cross-sectional view of a reactor cavity of a related art BWR, while FIG. 4 is a schematic top plan view of a section of a reactor core in a related art BWR. As shown in FIG. 3, in-core instrument 300 may include an in-core part 302, approximately 15 feet in length (about 4.5 meters), of relatively higher radioactivity, and/or an out-of-core part 304, approximately 27 feet in length (about 8 meters), of relatively lower radioactivity. In-core instrument 300 may be withdrawn from an operative position in reactor core 306 by conventional means and/or may be suspended, by an end, from a conventional equipment-handling crane (not shown), with in-core part 302 uppermost.

First temporary storage container 308 and/or second temporary storage container 310 may be provided in reactor core 306. First temporary storage container 308 and/or second temporary storage container 310 may have outer dimensions substantially identical to either a control rod guide blade 400 (FIG. 4) or a core grid cell 402 (FIG. 4) of one control rod 404 and four fuel assembles 406 (FIG. 4). First temporary storage container 308 and second temporary storage container 310 may extend between and may be temporarily supported by top guide 312 and fuel support plate 314. A remotely operated cutting device 316 may be superposed on first temporary storage container 308.

In-core instrument 300, which may be vertically aligned with first temporary storage container 308, may be lowered until a portion 408 of out-of-core part 304 is within first temporary storage container 308. Cutting device 316 may then be operated to sever the portion of in-core instrument 300 within first temporary storage container 308. In-core instrument 300 may then be lowered further, until another portion 408 of out-of-core part 304 is within first temporary storage container 308, and cutting device 316 may again be operated to sever the portion 408 of in-core instrument 300 within first temporary storage container 308. This proceeding may be repeated until all of out-of-core part 304 of in-core instrument 300 is within first temporary storage container 308. Preferably, out-of-core part 304 may be cut into three portions 408.

With out-of-core part 304 thus removed, the remainder 410 of in-core instrument 300, i.e., in-core part 302, may be lowered into second temporary storage container 310.

Now temporary storage container 308 and second temporary storage container 310 may be removed from reactor core 306 by the equipment-handling crane.

It is to be noted that the entire removal procedure for in-core instrument 300 may be performed beneath a protective water shield (e.g., beneath a minimum 5-foot depth (about 1.5 meters)).

A second cutting device (not shown) may be disposed on second temporary storage container 310 so as to permit cutting in-core part 302 of in-core instrument 300 into sections, in the manner of out-of-core part 304. Alternatively, after severance of out-of-core part 304 from in-core instrument 300, in-core part 302 may be removed from the reactor cavity directly, without use of a temporary storage container.

SUMMARY

Example embodiments may provide systems for disposing of one or more radioactive components from nuclear reactors of nuclear plants. Example embodiments also may provide methods for disposing of one or more radioactive components from nuclear reactors of nuclear plants.

In some example embodiments, a system for disposing of one or more radioactive components from a nuclear reactor of a nuclear plant may comprise a first receptacle configured to receive the one or more radioactive components, a frame configured to support the first receptacle in the nuclear reactor, and/or a device configured to separate the one or more radioactive components into two or more portions during lowering of the one or more radioactive components into the first receptacle.

In some example embodiments, the one or more radioactive components may comprise core instrumentation.

In some example embodiments, the frame may be configured to vertically support the first receptacle in the nuclear reactor by using a fuel support of the nuclear reactor.

In some example embodiments, the frame may be configured to vertically support the device in the nuclear reactor by using a fuel support of the nuclear reactor.

In some example embodiments, the frame may be configured to horizontally support the first receptacle in the nuclear reactor by using a top guide of the nuclear reactor.

In some example embodiments, the frame may be configured to horizontally support the device in the nuclear reactor by using a top guide of the nuclear reactor.

In some example embodiments, when the device separates the one or more radioactive components into the two or more portions, the device may be operatively connected to the frame.

In some example embodiments, the system may further comprise a second receptacle configured to receive the one or more radioactive components. The frame may be further configured to support the second receptacle in the nuclear reactor. The system may be configured to allow replacement of the first receptacle by the second receptacle without removing the frame from an area of a reactor core of the nuclear reactor.

In some example embodiments, the system may be further configured to allow replacement of the first receptacle by the second receptacle when the device is not operatively connected to the frame.

In some example embodiments, the first receptacle may comprise internal subdivisions configured to facilitate organization of the two or more portions.

In some example embodiments, a method for disposing of one or more radioactive components from a nuclear reactor of a nuclear plant may comprise assembling a system for disposing of the one or more radioactive components, the system comprising a first receptacle configured to receive the one or more radioactive components, a frame configured to support the first receptacle in the nuclear reactor, and a device configured to separate the one or more radioactive components into two or more portions; moving the assembled system to an area of a reactor core of the nuclear reactor; lowering the one or more radioactive components into the first receptacle; separating the one or more radioactive components into the two or more portions by using the device; and/or removing the two or more portions in the first receptacle from the area of the reactor core of the nuclear reactor.

In some example embodiments, the lowering of the one or more radioactive components into the first receptacle and the separating of the one or more radioactive components by using the device may be repeated as required to separate the one or more radioactive components into the two or more portions.

In some example embodiments, the removing of the two or more portions in the first receptacle from the area of the reactor core of the nuclear reactor may comprise removing the assembled system from the area of the reactor core of the nuclear reactor.

In some example embodiments, the method may further comprise disassembling at least part of the assembled system before removing the two or more portions in the first receptacle from the area of the reactor core of the nuclear reactor.

In some example embodiments, the method may further comprise sealing the first receptacle before removing the two or more portions in the first receptacle from the area of the reactor core of the nuclear reactor.

In some example embodiments, a method for disposing of one or more radioactive components from a nuclear reactor of a nuclear plant may comprise at least partly assembling a system for disposing of the one or more radioactive components in an area of a reactor core of the nuclear reactor, the system comprising a first receptacle configured to receive the one or more radioactive components, a frame configured to support the first receptacle in the nuclear reactor, and a device configured to separate the one or more radioactive components into two or more portions; lowering the one or more radioactive components into the first receptacle; separating the one or more radioactive components into the two or more portions by using the device; and/or removing the two or more portions in the first receptacle from the area of the reactor core of the nuclear reactor.

In some example embodiments, the lowering of the one or more radioactive components into the first receptacle and the separating of the one or more radioactive components by using the device may be repeated as required to separate the one or more radioactive components into the two or more portions.

In some example embodiments, the removing of the two or more portions in the first receptacle from the area of the reactor core of the nuclear reactor may comprise removing the assembled system from the area of the reactor core of the nuclear reactor.

In some example embodiments, the method may further comprise disassembling at least part of the assembled system before removing the two or more portions in the first receptacle from the area of the reactor core of the nuclear reactor.

In some example embodiments, the method may further comprise sealing the first receptacle before removing the two or more portions in the first receptacle from the area of the reactor core of the nuclear reactor.

These and other features and advantages of this invention are described in, or are apparent from, the following detailed description of various example embodiments of the apparatuses and methods according to the invention.

BRIEF DESCRIPTION OF THE DRAWINGS

The above and/or other aspects and advantages will become more apparent and more readily appreciated from the following detailed description of example embodiments, taken in conjunction with the accompanying drawings, in which.

DETAILED DESCRIPTION OF EXAMPLE EMBODIMENTS

Figure 1:
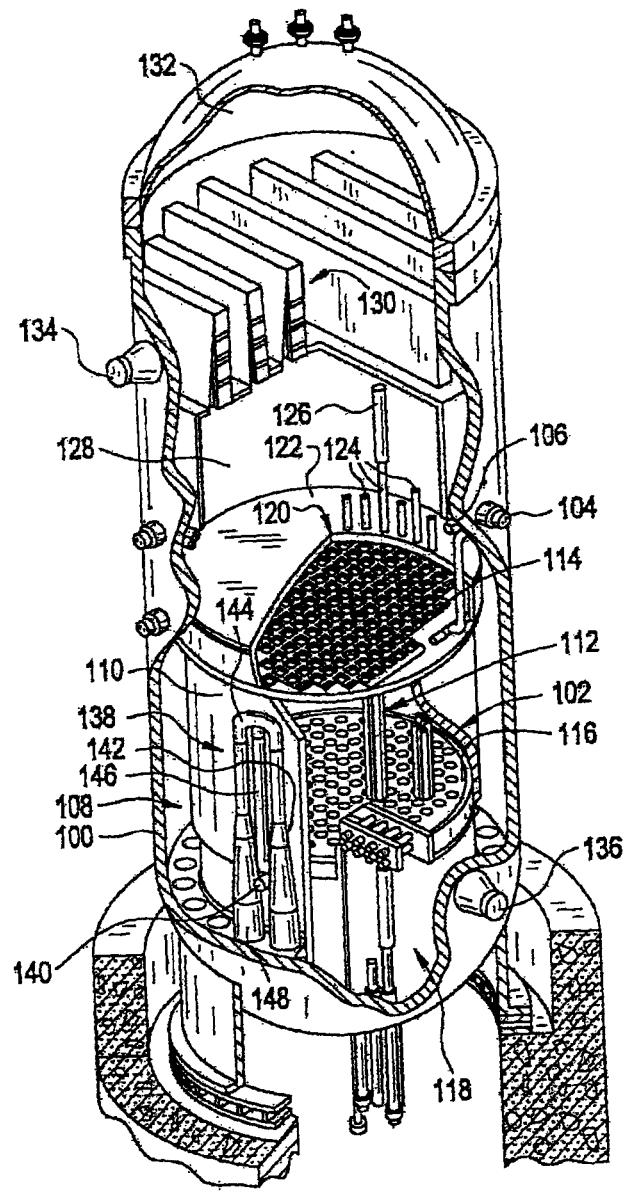
FIG. 1 is a sectional view, with parts cut away, of an RPV in a related art BWR.
Figure 2:
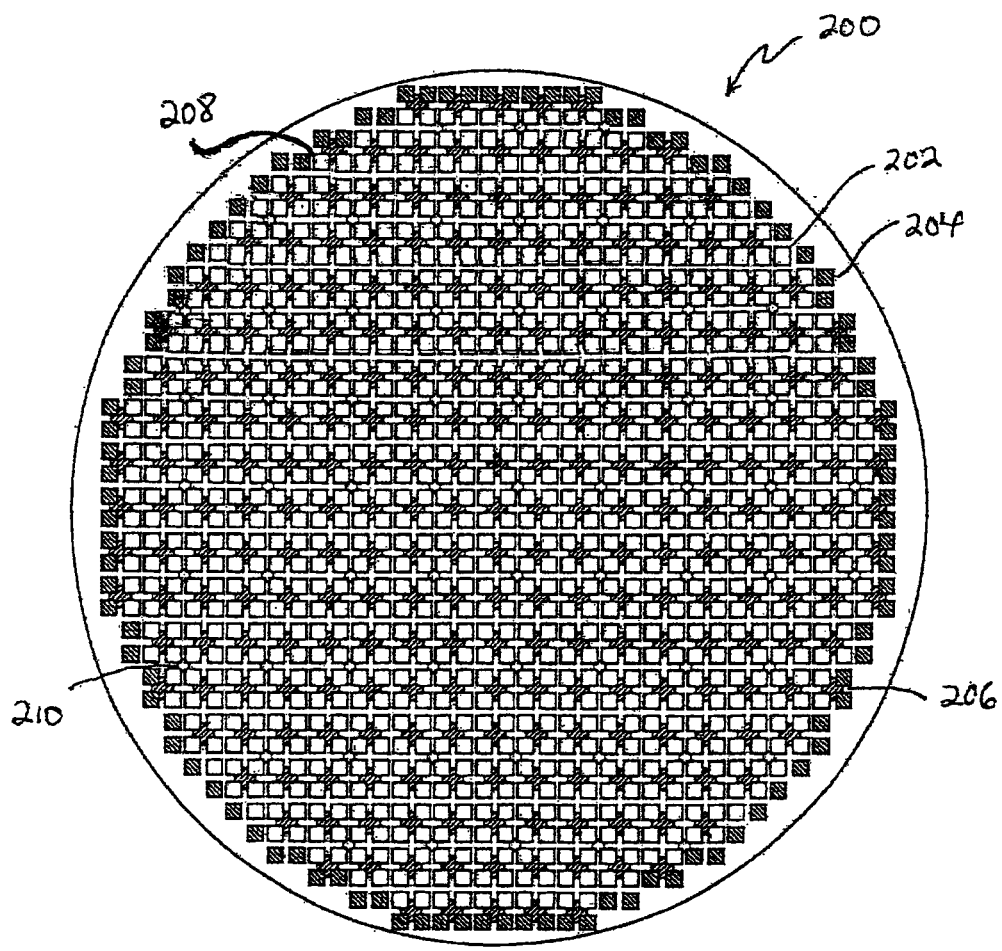
FIG. 2 is a top plan view of a core in a related art BWR.
Figure 3:
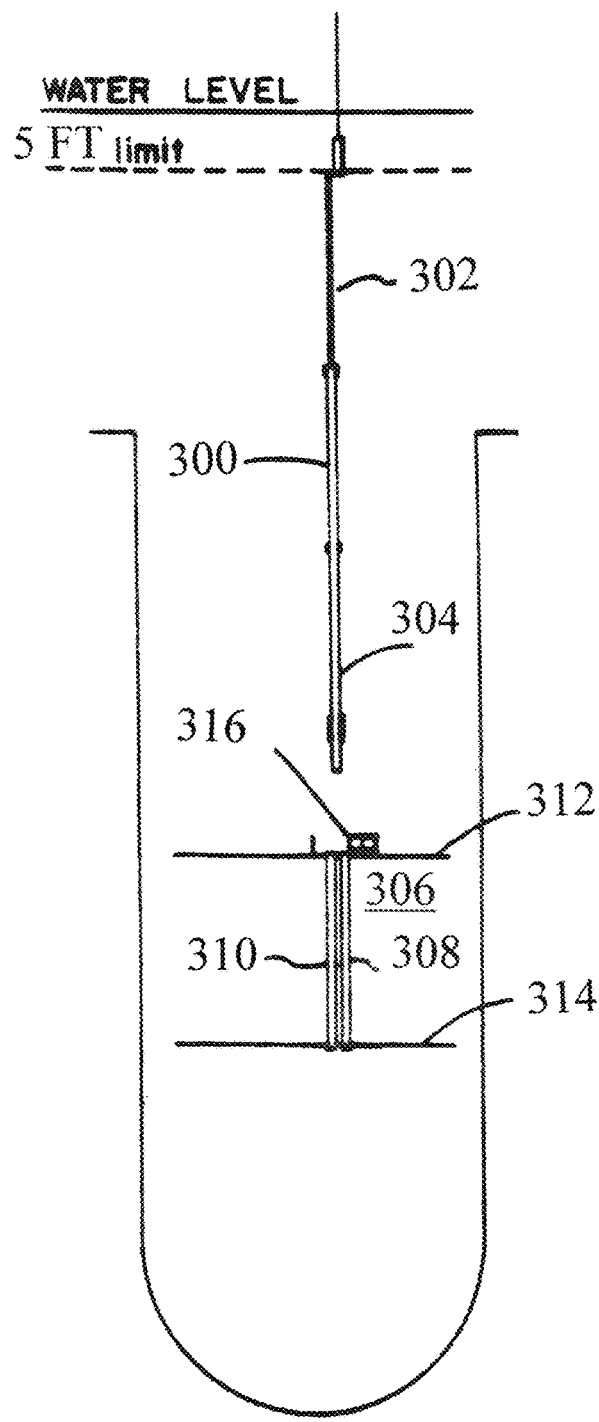
FIG. 3 is a simplified schematic cross-sectional view of a reactor cavity of a related art BWR.
Figure 4:
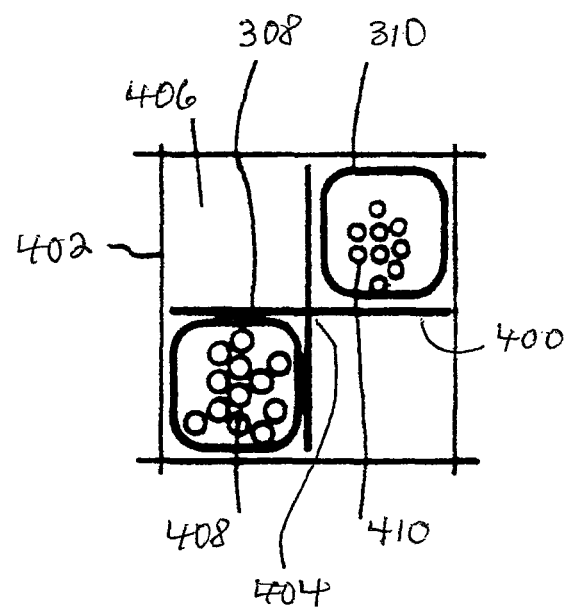
FIG. 4 is a schematic top plan view of a section of a core in a related art BWR.

Example embodiments will now be described more fully with reference to the accompanying drawings. Embodiments, however, may be embodied in many different forms and should not be construed as being limited to the embodiments set forth herein. Rather, these example embodiments are provided so that this disclosure will be thorough and complete, and will fully convey the scope to those skilled in the art. In the drawings, the thicknesses of layers and regions are exaggerated for clarity.

It will be understood that when an element is referred to as being "on," "connected to," "electrically connected to," or "coupled to" to another component, it may be directly on, connected to, electrically connected to, or coupled to the other component or intervening components may be present. In contrast, when a component is referred to as being "directly on," "directly connected to," "directly electrically connected to," or "directly coupled to" another component, there are no intervening components present. As used herein, the term "and/or" includes any and all combinations of one or more of the associated listed items.

It will be understood that although the terms first, second, third, etc., may be used herein to describe various elements, components, regions, layers, and/or sections, these elements, components, regions, layers, and/or sections should not be limited by these terms. These terms are only used to distinguish one element, component, region, layer, and/or section from another element, component, region, layer, and/or section. For example, a first element, component, region, layer, and/or section could be termed a second element, component, region, layer, and/or section without departing from the teachings of example embodiments.

Spatially relative terms, such as "beneath," "below," "lower," "above," "upper," and the like may be used herein for ease of description to describe the relationship of one component and/or feature to another component and/or feature, or other component(s) and/or feature(s), as illustrated in the drawings. It will be understood that the spatially relative terms are intended to encompass different orientations of the device in use or operation in addition to the orientation depicted in the figures.

The terminology used herein is for the purpose of describing particular example embodiments only and is not intended to be limiting of example embodiments. As used herein, the singular forms "a," "an," and "the" are intended to include the plural forms as well, unless the context clearly indicates otherwise. It will be further understood that the terms "comprises," "comprising," "includes," and/or "including," when used in this specification, specify the presence of stated features, integers, steps, operations, elements, and/or components, but do not preclude the presence or addition of one or more other features, integers, steps, operations, elements, components, and/or groups thereof.

Unless otherwise defined, all terms (including technical and scientific terms) used herein have the same meaning as commonly understood by one of ordinary skill in the art to which example embodiments belong. It will be further understood that terms, such as those defined in commonly used dictionaries, should be interpreted as having a meaning that is consistent with their meaning in the context of the relevant art and should not be interpreted in an idealized or overly formal sense unless expressly so defined herein.

It should also be noted that in some alternative implementations, functions, and/or acts noted may occur out of the order noted in the figures. For example, two figures shown in succession may in fact be executed substantially concurrently or may sometimes be executed in the reverse order, depending upon the functionality and/or acts involved.

Reference will now be made to example embodiments, which are illustrated in the accompanying drawings, wherein like reference numerals may refer to like components throughout.

In some example embodiments, a system for disposing of one or more radioactive components from a nuclear reactor of a nuclear plant may comprise a first receptacle configured to receive the one or more radioactive components, a frame configured to support the first receptacle in the nuclear reactor, and/or a device configured to separate the one or more radioactive components into two or more portions during lowering of the one or more radioactive components into the first receptacle.

In some example embodiments, a method for disposing of one or more radioactive components from a nuclear reactor of a nuclear plant may comprise assembling a system for disposing of the one or more radioactive components, the system comprising a first receptacle configured to receive the one or more radioactive components, a frame configured to support the first receptacle in the nuclear reactor, and a device configured to separate the one or more radioactive components into two or more portions; moving the assembled system to an area of a reactor core of the nuclear reactor; lowering the one or more radioactive components into the first receptacle; separating the one or more radioactive components into the two or more portions by using the device; and/or removing the two or more portions in the first receptacle from the area of the reactor core of the nuclear reactor.

In some example embodiments, a method for disposing of one or more radioactive components from a nuclear reactor of a nuclear plant may comprise at least partly assembling a system for disposing of the one or more radioactive components in an area of a reactor core of the nuclear reactor, the system comprising a first receptacle configured to receive the one or more radioactive components, a frame configured to support the first receptacle in the nuclear reactor, and a device configured to separate the one or more radioactive components into two or more portions; lowering the one or more radioactive components into the first receptacle; separating the one or more radioactive components into the two or more portions by using the device; and/or removing the two or more portions in the first receptacle from the area of the reactor core of the nuclear reactor.

The term "disposing" includes, but is not limited to, removing the one or more radioactive components from the nuclear reactor. The removal may be permanent. Such permanent removal may relate to removing the one or more radioactive components for transfer to a temporary storage, such as a storage pool. In additional or in the alternative, such permanent removal may relate to removing the one or more radioactive components from the nuclear plant for long-term storage, processing, reprocessing, or other temporary and/or final disposition known to a person having ordinary skill in the art ("PHOSITA").

The term "radioactive component" includes, but is not limited to, any radioactive IRM, LPRM, PRM, SRM, SRNM, WRNM, or similar neutron monitor of the nuclear reactor subject to radioactive decay as a result of exposure to ionizing radiation (e.g., alpha, beta, gamma) and/or contamination (e.g., internal, surface, airborne) of the nuclear reactor, and/or that includes one or more other sources of radioactivity (e.g., an internal radioactive source); any alpha, beta, gamma, or similar radiation monitor of the nuclear reactor subject to radioactive decay as a result of exposure to ionizing radiation and/or contamination of the nuclear reactor, and/or that includes one or more other sources of radioactivity; any other sensor and/or instrument (e.g., pressure, rod height, temperature) of the nuclear reactor subject to radioactive decay as a result of exposure to ionizing radiation and/or contamination of the nuclear reactor, and/or that includes one or more other sources of radioactivity; and any other constituent (e.g., control rod, instrument dry tube, sensor dry tube) of the nuclear reactor subject to radioactive decay as a result of exposure to ionizing radiation and/or contamination of the nuclear reactor, and/or that includes one or more other sources of radioactivity. The term "radioactive component" includes, but is not limited to, portions of the nuclear reactor subject to radioactive decay as a result of exposure to ionizing radiation and/or contamination while in or near the reactor core of the nuclear reactor during power operation.

The term "receptacle" includes, but is not limited to, a container configured to receive the two or more portions of the one or more radioactive components.

The term "frame" includes, but is not limited to, a substantially rigid structure configured to support the receptacle.

The term "support" includes, but is not limited to, bearing forces (e.g., weight, impact) associated with the device, frame, and/or receptacle; bearing forces (e.g., weight, impact) associated with the one or more radioactive components; limiting movement associated with the device, frame, and/or receptacle in horizontal and/or vertical directions; limiting rotational movement associated with the device, frame, and/or receptacle; distributing forces (e.g., weight, impact) associated with the device, frame, and/or receptacle to other parts (e.g., top guide, fuel support) of the nuclear reactor; and/or distributing forces (e.g., weight, impact) associated with the one or more radioactive components to other parts (e.g., top guide, fuel support) of the nuclear reactor.

The term "device" includes any mechanism configured to separate a component into two or more portions. The term "device" includes for example, a cutter.

The term "during lowering" includes any time during a process of moving a radioactive component into a receptacle of the system, while any part of the radioactive component is within the device or receptacle, whether the radioactive component is moving into the receptacle at the time, is moving out of the receptacle at the time, or is not moving into or out of the receptacle at the time. The radioactive component also may be moving laterally and/or in rotation relative to the receptacle at the time, either in addition to or in the alternative to moving into the receptacle at the time, moving out of the receptacle at the time, or not moving into or out of the receptacle at the time.

As would be understood by a PHOSITA, when handling the radioactive component, the radioactive component must be kept below a level at which adequate radiation shielding is provided. In a BWR, for example, such radiation shielding may be provided by a sufficient depth of water.

Figure 5A:
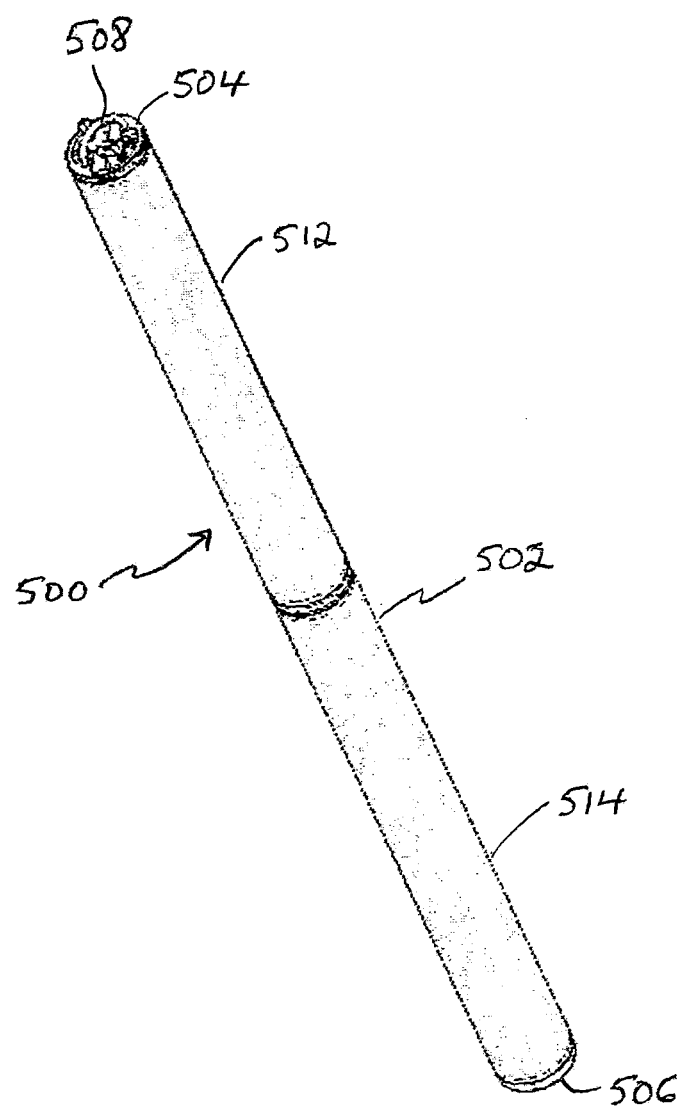
FIG. 5A is a first perspective view of a receptacle according to some example embodiments.
Figure 5B:
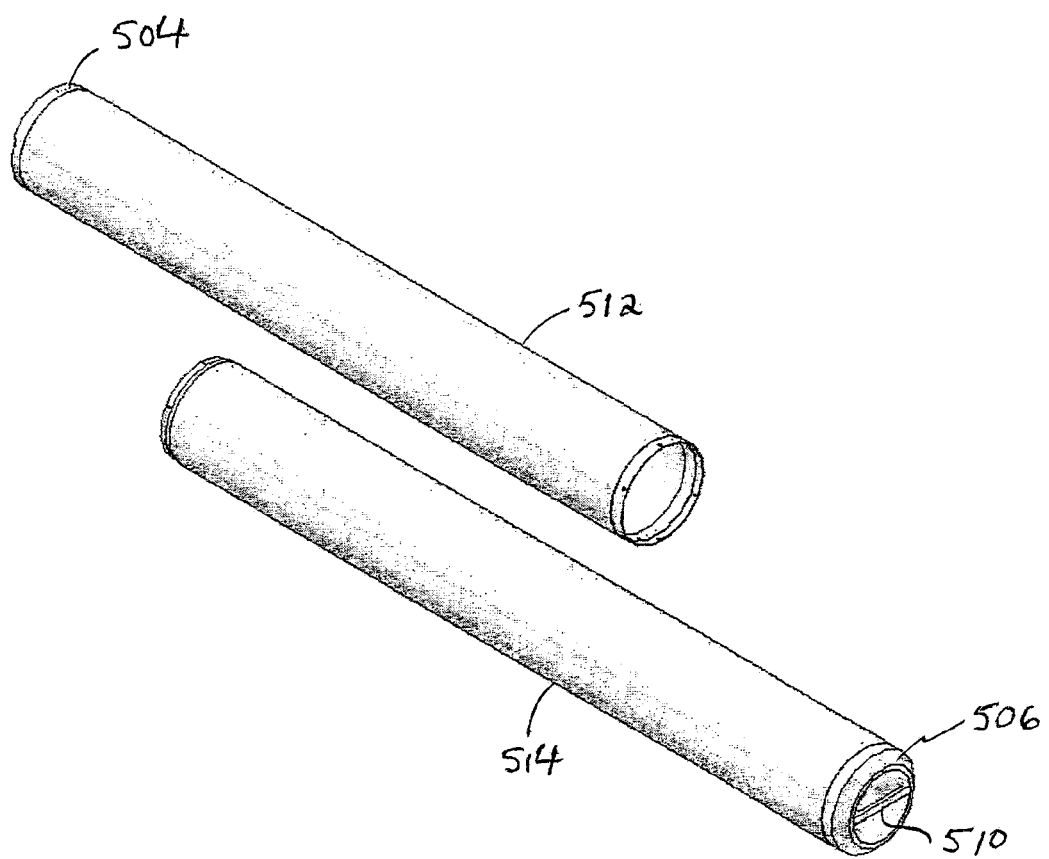
FIG. 5B is a second perspective view of the receptacle of FIG. 5A according to some example embodiments.

FIG. 5A is a first perspective view of receptacle 500 according to some example embodiments; FIG. 5B is a second perspective view of receptacle 500 according to some example embodiments.

For ease of manufacture, storage, transportation, assembly, and/or use, receptacle 500 may comprise a lid or similar component for sealing receptacle 500. As shown in FIG. 5A, for example, receptacle 500 may comprise, for example, shell 502, lid 504, and/or base 506.

For ease of manufacture, storage, transportation, assembly, and/or use, receptacle 500 may comprise one or more lifting points or similar components. As shown in FIGS. 5A and 5B, for example, receptacle 500 may comprise, for example, first lifting point 508 and/or second lifting point 510.

As shown in FIGS. 5A and 5B, shell 502 may comprise, for example, first sub-shell 512 and/or second sub-shell 514. As shown in FIGS. 5A and 5B, first lifting point 508 may be associated with lid 504 and/or first sub-shell 512, while second lifting point 510 may be associated with base 506 and/or second sub-shell 514.

First sub-shell 512 and second sub-shell 514 may ease manufacture, storage, transportation, assembly, and/or use of receptacle 500. For example, receptacle 500 may be transported to the nuclear plant in two or more pieces (e.g., first sub-shell 512 not attached to second sub-shell 514, lid 504 attached to first sub-shell 512, base 506 attached to second sub-shell 514) for assembly at the nuclear plant (on release for fabrication or "RFF"). Due to the nature of its use, assembly of receptacle 500 may be a one-time assembly (e.g., receptacle 500 may be disposed of as radioactive waste along with the one or more radioactive components inside receptacle 500). Shell 502 also may comprise more than two sub-shells.

Receptacle 500 may be sized to facilitate holding the two or more portions of the one or more radioactive components (receptacle 500 generally larger than the two or more portions in order to fit the two or more portions in receptacle 500). Receptacle 500 may be sized to facilitate support by frame 600 (FIGS. 6A and 6B) (e.g., receptacle 500 generally smaller than frame 600 in order to substantially fit receptacle 500 in frame 600). Receptacle 500 may be sized to facilitate transfer to a temporary storage, such as a storage pool (e.g., sized to be sent down an inclined fuel transfer system to a lower storage pool of a BWR/6).

During use of receptacle 500, first sub-shell 512 may be attached to second sub-shell 514, and base 506 may be attached to second sub-shell 514, for example, prior to lowering the one or more radioactive components into receptacle 500. When ready to remove the two or more portions in receptacle 500 from the area of the reactor core of the nuclear reactor, lid 504 may be attached to first sub-shell 512 to seal receptacle 500.

Mechanisms and processes for attachment of lid 504 to first sub-shell 512, first sub-shell 512 to second sub-shell 514, and/or base 506 to second sub-shell 514 are known to a PHOSITA.

Receptacle 500 may comprise steel, such as stainless steel (e.g., type 304 stainless steel, type 316 stainless steel), and/or other suitable materials known to a PHOSITA.

Receptacle 500 may comprise internal subdivisions (not shown) configured to facilitate organization of the two or more portions. For example, receptacle 500 may comprise one or more baffles (not shown) to facilitate such organization (e.g., baffles within receptacle 500 may facilitate organized stacking of portions of an instrument dry tube).

Figure 6A:
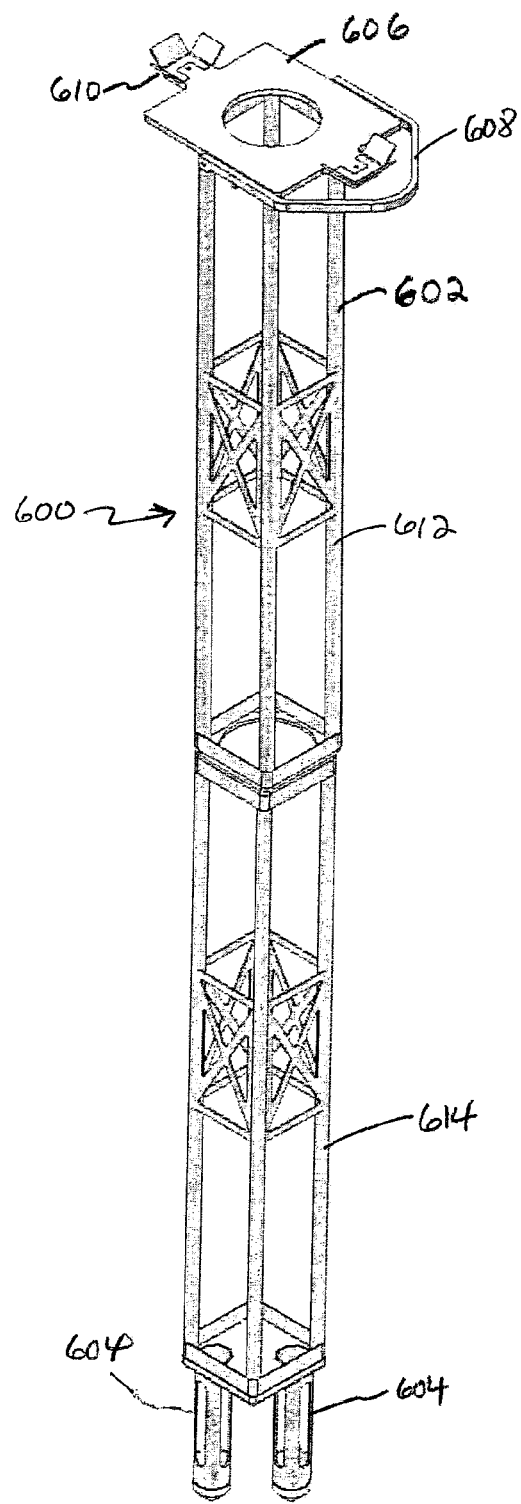
FIG. 6A is a first perspective view of a frame according to some example embodiments.
Figure 6B:
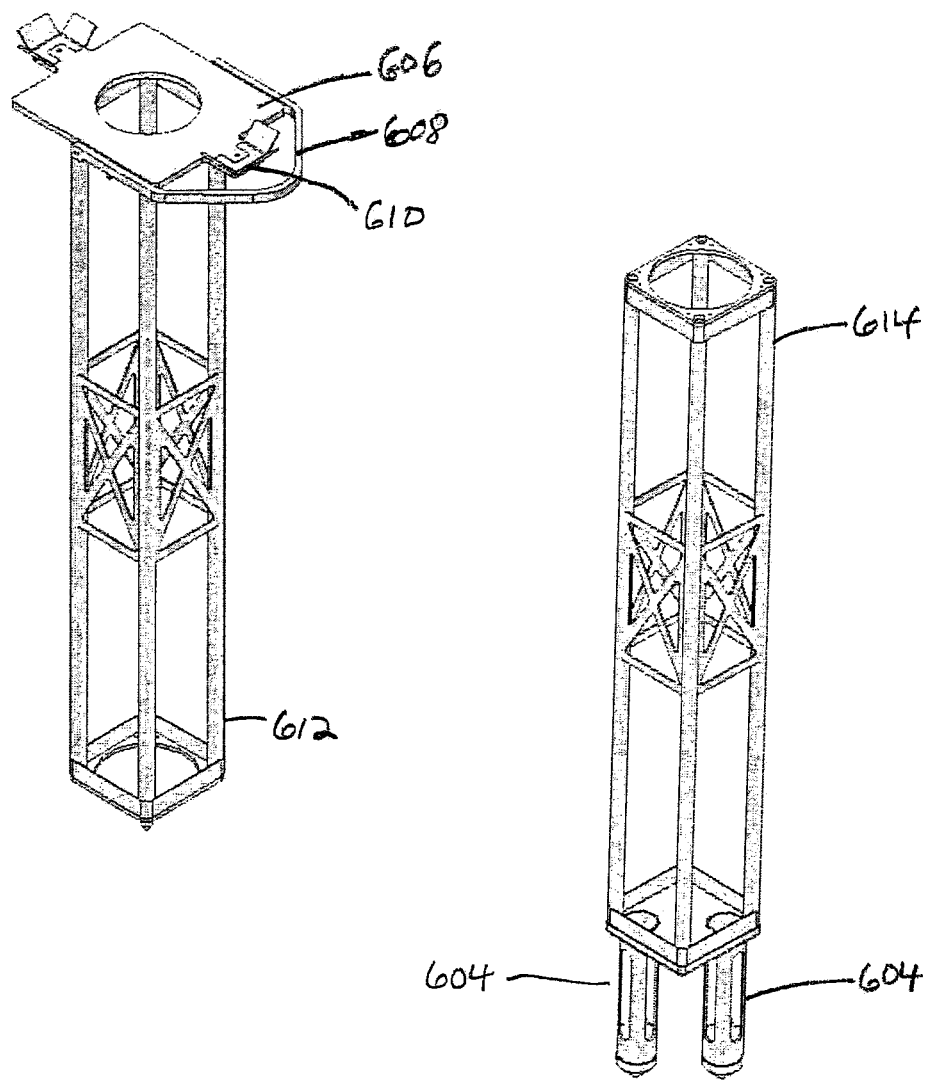
FIG. 6B is a second perspective view of the frame of FIG. 6A according to some example embodiments.
Figure 6C:
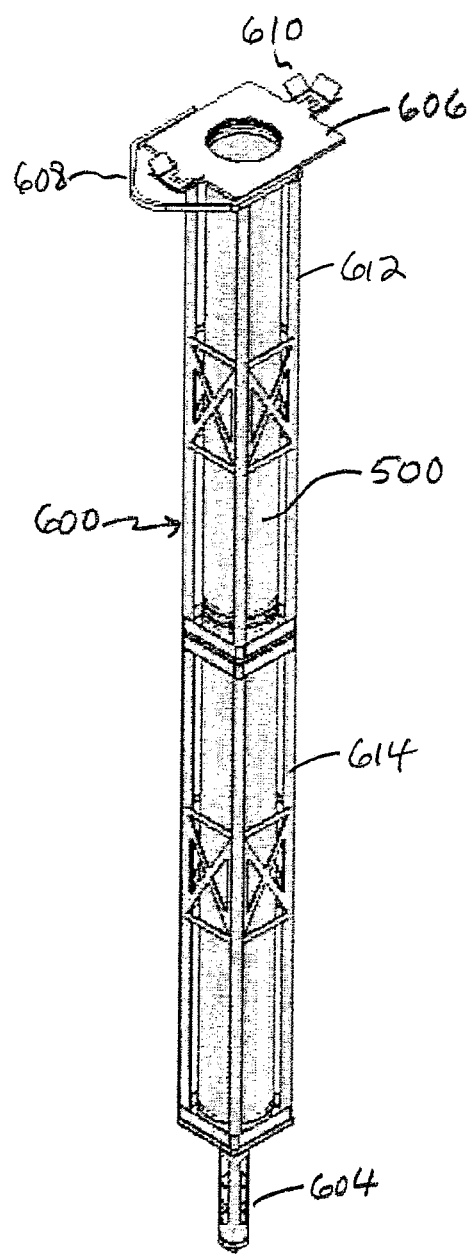
FIG. 6C is a perspective view of the receptacle of FIG. 5A and the frame of FIG. 6A according to some example embodiments.

FIG. 6A is a first perspective view of frame 600 according to some example embodiments; FIG. 6B is a second perspective view of frame 600 according to some example embodiments; FIG. 6C is a perspective view of receptacle 500 and frame 600 according to some example embodiments.

For ease of manufacture, storage, transportation, assembly, and/or use, frame 600 may comprise legs to support frame 600 by using a fuel support of the nuclear reactor and/or a platform for supporting a device configured to separate one or more radioactive components into two or more portions. As shown in FIG. 6A, for example, frame 600 may comprise, for example, framework 602, legs 604, and/or platform 606.

For ease of manufacture, storage, transportation, assembly, and/or use, frame 600 may comprise one or more lifting handles or similar components. As shown in FIGS. 6A and 6B, for example, frame 600 also may comprise, for example, lifting handle 608.

For ease of manufacture, storage, transportation, assembly, and/or use, frame 600 may comprise mounting apparatus 610, as shown in FIGS. 6A and 6B.

For ease of manufacture, storage, transportation, assembly, and/or use, frame 600 may comprise an open structure, as shown in FIGS. 6A and 6B, and/or other suitable structures known to a PHOSITA.

As shown in FIGS. 6A and 6B, framework 602 may comprise, for example, first sub-framework 612 and/or second sub-framework 614. As shown in FIGS. 6A and 6B, lifting handle 608 may be associated with platform 606 and/or first sub-framework 612, while legs 604 may be associated with second sub-framework 614.

First sub-framework 612 and/or second sub-framework 614 may ease manufacture, storage, transportation, assembly, and/or use of frame 600. For example, frame 600 may be transported to the nuclear plant in two or more pieces (e.g., first sub-framework 612 not attached to second sub-framework 614, platform 606 attached to first sub-framework 612, legs 604 attached to second sub-framework 614) for assembly at the nuclear plant (on RFF). Due to the nature of its use, assembly of frame 600 may be a one-time assembly. Framework 602 also may comprise more than two sub-frameworks.

Frame 600 may be sized to facilitate supporting receptacle 500 (e.g., frame 600 generally larger than receptacle 500 in order to substantially fit receptacle 500 in frame 600). Frame 600 may be sized to facilitate lowering frame 600 through a top guide of the nuclear reactor (e.g., frame 600 generally smaller than the top guide in order to fit frame 600 in the top guide).

During use of frame 600, first sub-framework 612 may be attached to second sub-framework 614, platform 606 may be attached to first sub-framework 612, and legs 604 may be attached to second sub-framework 614, for example, prior to lowering frame 600 through the top guide of the nuclear reactor.

Mechanisms and processes for attachment of platform 606 to first sub-framework 612, first sub-framework 612 to second sub-framework 614, and/or legs 604 to second sub-framework 614 are known to a PHOSITA.

Frame 600 may comprise steel, such as stainless steel (e.g., type 304 stainless steel, type 316 stainless steel), and/or other suitable materials known to a PHOSITA.

Frame 600 may comprise internal subdivisions (not shown) configured to facilitate organization of two or more receptacles 500 (not shown in this configuration).

Due to the nature of its use, frame 600 may be disposed of as radioactive waste after disposing of the one or more radioactive components. Typically, however, receptacle 500 would be disposed of as radioactive waste, while frame 600 would be reused as long as it remains serviceable.

Figure 7A:
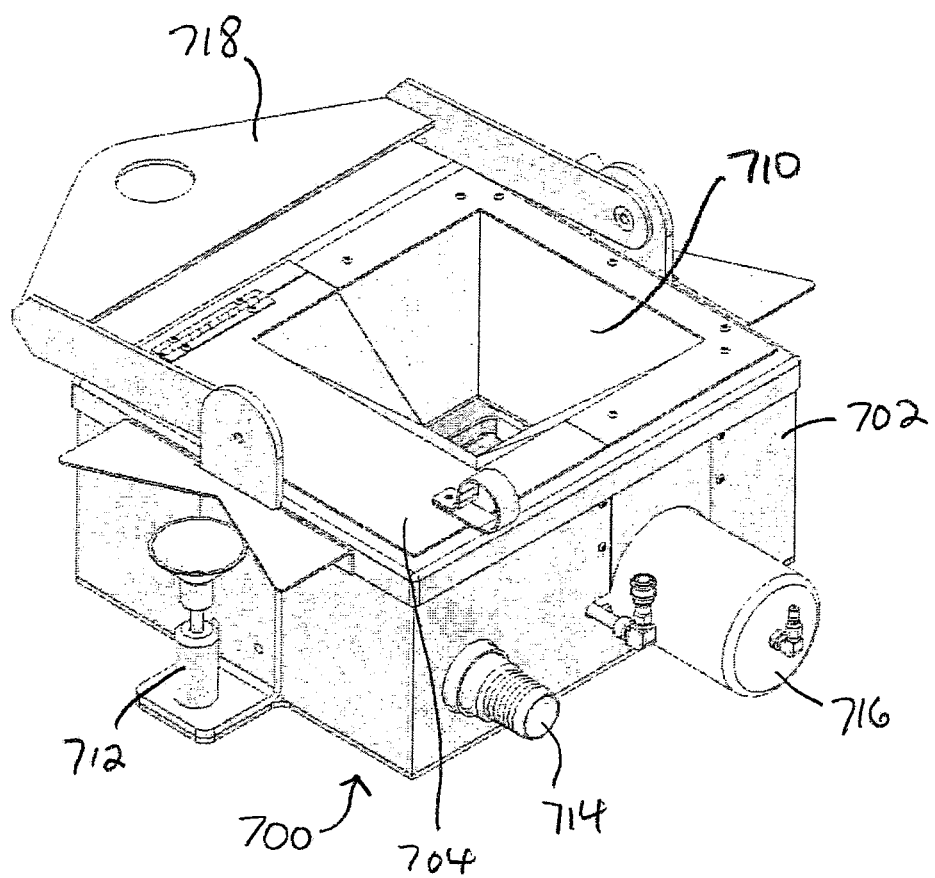
FIG. 7A is a first perspective view of a device according to some example embodiments.
Figure 7B:
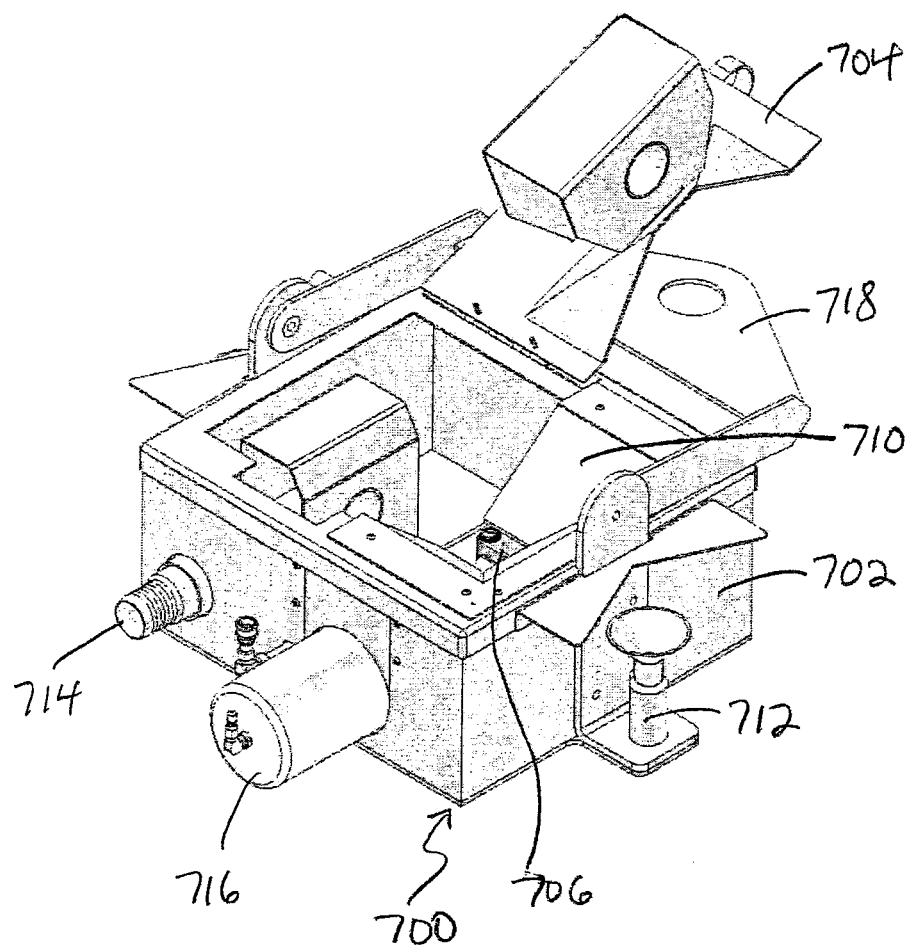
FIG. 7B is a second perspective view of the device of FIG. 7A according to some example embodiments.
Figure 7C:
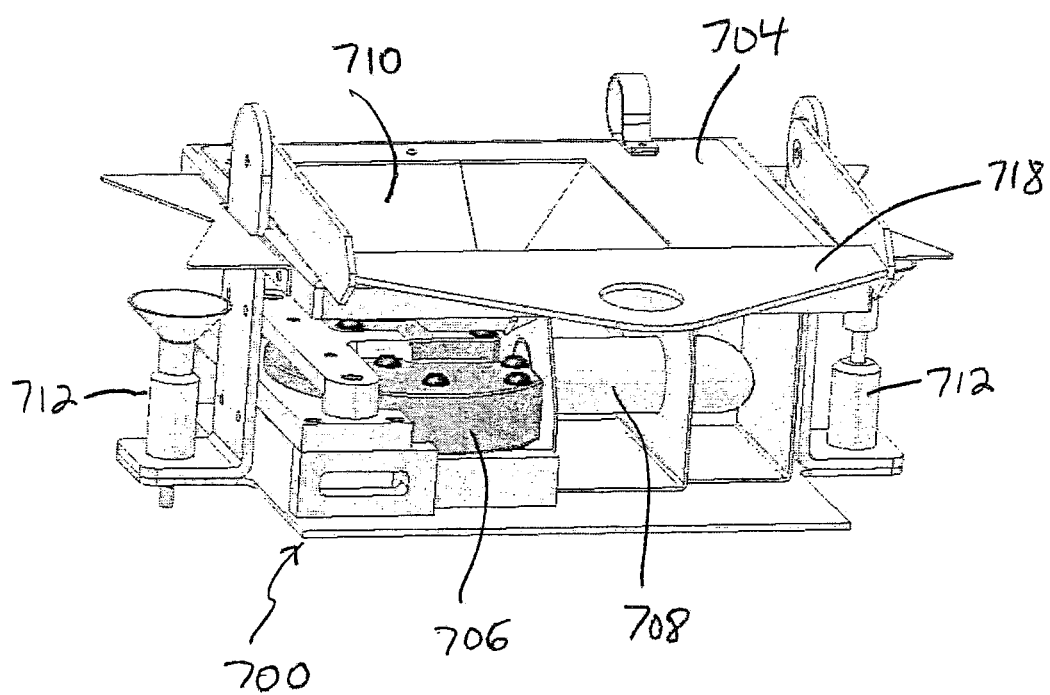
FIG. 7C is a third perspective view of the device of FIG. 7A according to some example embodiments.
Figure 7D:
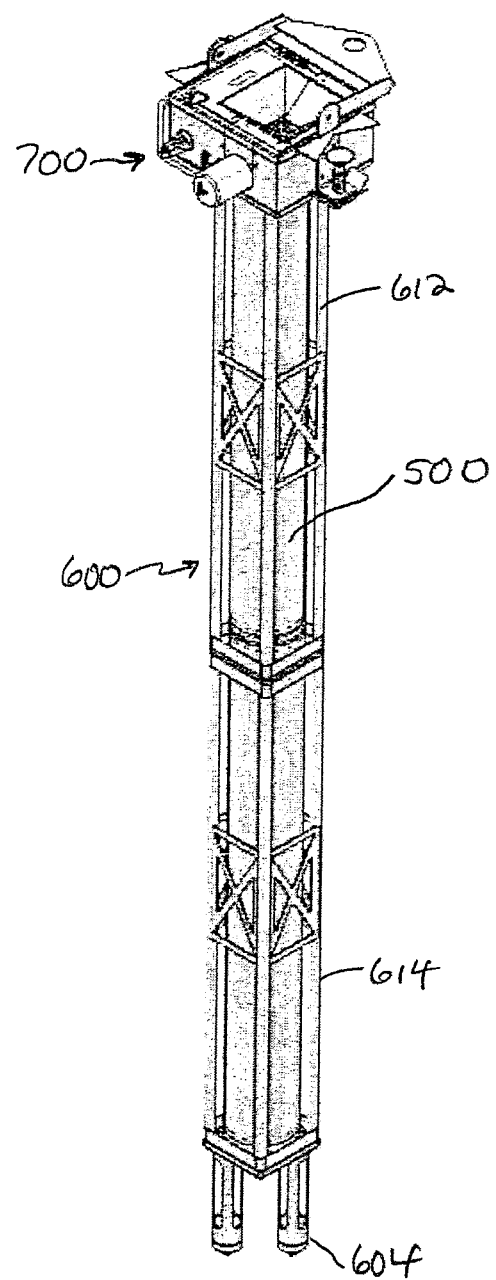
FIG. 7D is a perspective view of the receptacle of FIG. 5A, the frame of FIG. 6A, and the device of FIG. 7A according to some example embodiments.

FIG. 7A is a first perspective view of device 700 according to some example embodiments; FIG. 7B is a second perspective view of device 700 according to some example embodiments; FIG. 7C is a perspective view of an interior of device 700 according to some example embodiments; FIG. 7D is a perspective view of receptacle 500, frame 600, and device 700 according to some example embodiments.

As shown in FIGS. 7A, 7B, and 7C, for example, device 700 may comprise, for example, casing 702 and/or panel 704. Panel 704 may provide access to the interior of casing 702 during operation for inspection and/or troubleshooting. Panel 704 may provide access to receptacle 500 during operation for inspection and/or troubleshooting. The interior of casing 702 may include cutter 706 and swarf collection system 708. The exterior of casing 702 may include guide 710, mounting apparatus 712, swarf collection system connection 714, cutter power connection 716, and/or lifting handle 718.

Cutter 706 may comprise a cutting mechanism or similar piece of equipment (e.g., a modified, commercially available hydraulic cutter from H. K. Porter®). Cutter 706 may be powered, for example, electrically, hydraulically, manually, and/or pneumatically. Cutter 706 may abrade, cut, grate, grind, pinch off, or otherwise operate on the radioactive component from a nuclear reactor of a nuclear plant to separate the radioactive components into two or more portions.

During use of cutter 706, fine metallic filings and/or shavings, known as swarf, may be produced. Swarf collection system 708 and/or swarf collection system connection 714 may provide a way to remove the swarf as it is being produced by cutter 706 in order to help maintain cleanliness requirements for the nuclear reactor.

Guide 710 may assist one or more operators of device 700 in lowering one or more radioactive components through device 700 and/or into receptacle 500.

Device 700 may be sized to facilitate support by platform 606 and/or frame 600 (e.g., device 700 sized to facilitate operatively connecting (e.g., mounting) device 700 on platform 606 and/or frame 600). Device 700 may be sized to prevent lowering device 700 through a top guide of the nuclear reactor (e.g., device 700 generally larger than the top guide in order to prevent device 700 from being lowered through the top guide).

During use of device 700 to separate a radioactive component into two or more portions, device 700 may be operatively connected to (e.g., mounted on) platform 606 and/or frame 600.

During use of device 700 to separate a radioactive component into two or more portions, the radioactive component may be lowered and separated as required (e.g., repeated as required in any sequence). For example, during use of device 700 to separate a radioactive component into two or more portions, the radioactive component may be alternately lowered and separated. In another example, during use of device 700 to separate a radioactive component into two or more portions, the radioactive component may be simultaneously lowered and separated.

During use of device 700 to separate a radioactive component into two or more portions, the radioactive component may be raised and separated as required (e.g., repeated as required in any sequence). For example, during use of device 700 to separate a radioactive component into two or more portions, the radioactive component may be alternately raised and separated. In another example, during use of device 700 to separate a radioactive component into two or more portions, the radioactive component may be simultaneously raised and separated.

During use of device 700 to separate a radioactive component into two or more portions, the radioactive component may be moving into the receptacle at the time, may be moving out of the receptacle at the time, or may not be moving into or out of the receptacle at the time. The radioactive component also may be moving laterally and/or in rotation relative to the receptacle at the time, either in addition to or in the alternative to moving into the receptacle at the time, moving out of the receptacle at the time, or not moving into or out of the receptacle at the time.

During use of device 700 to separate a radioactive component into two or more portions, one or more operators of device 700 may verify separation of the radioactive component into the two or more portions, for example, by visual observation using a remote camera.

During use of device 700 to separate a radioactive component into two or more portions, device 700 may move relative to platform 606 and/or frame 600 in order to facilitate organized stacking of the two or more portions in receptacle 500 (e.g., receptacle 500 may comprise one or more baffles to facilitate such organization).

During use of device 700, device 700 may move relative to receptacle 500 so that receptacle 500 receives at least one of the two or more portions in a first internal subdivision (not shown) of receptacle 500 and receives at least one of the two or more portions in a second internal subdivision (not shown) of receptacle 500.

As would be understood by a PHOSITA, receptacle 500 may rotate relative to frame 600 (with motive power provided, for example, at an interface between receptacle 500 and frame 600) and/or device 700 may rotate relative to frame 600 (with motive power provided, for example, at an interface between frame 600 and device 700). As would be understood by a PHOSITA, the rotation may be parallel to a longitudinal axis of receptacle 500.

During use of device 700, device 700 may be operated remotely, for example, by one or more operators reducing their radiation exposure using the principles of time, distance, and/or shielding.

Mechanisms and processes for operatively connecting (e.g., mounting) device 700 (e.g., using mounting apparatus 712) to platform 606 and/or frame 600 (e.g., using mounting apparatus 610) are known to a PHOSITA. Mounting apparatus 712 may comprise, for example, a captive bolt.

Device 700 may comprise steel, such as stainless steel (e.g., type 304 stainless steel, type 316 stainless steel), and/or other suitable materials known to a PHOSITA.

Due to the nature of its use, device 700 may be disposed of as radioactive waste after disposing of the one or more radioactive components. Typically, however, receptacle 500 would be disposed of as radioactive waste, while device 700 would be reused as long as it remains serviceable.

Figure 8A:
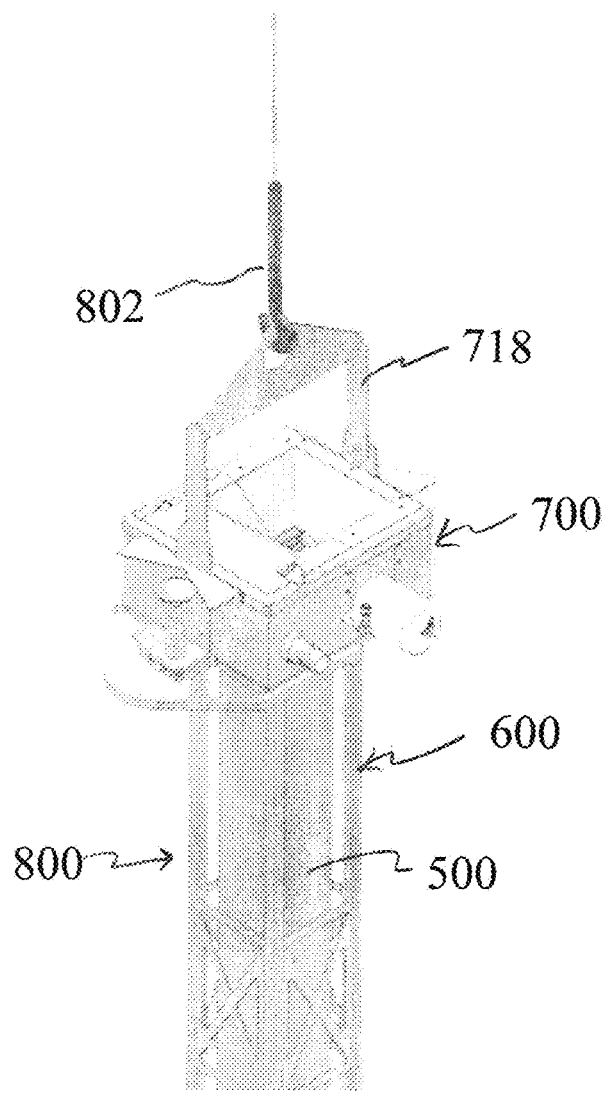
FIG. 8A is a perspective view of an upper portion of a fully assembled system for disposing of one or more radioactive components from a nuclear reactor of a nuclear plant, with a handling tool attached to a lifting handle.
Figure 8B:
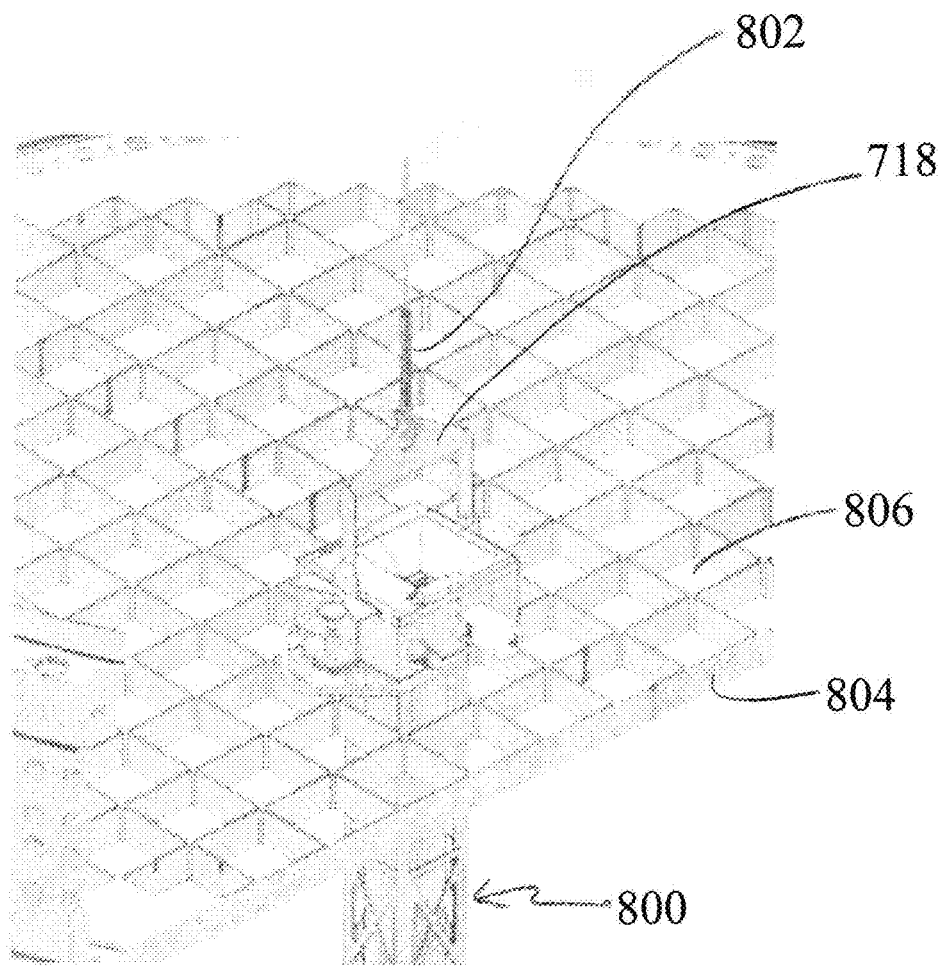
FIG. 8B is a perspective view of the upper portion of the fully assembled system of FIG. 8A being installed in or withdrawn from a top guide of the nuclear reactor using the handling tool and lifting handle.
Figure 8C:
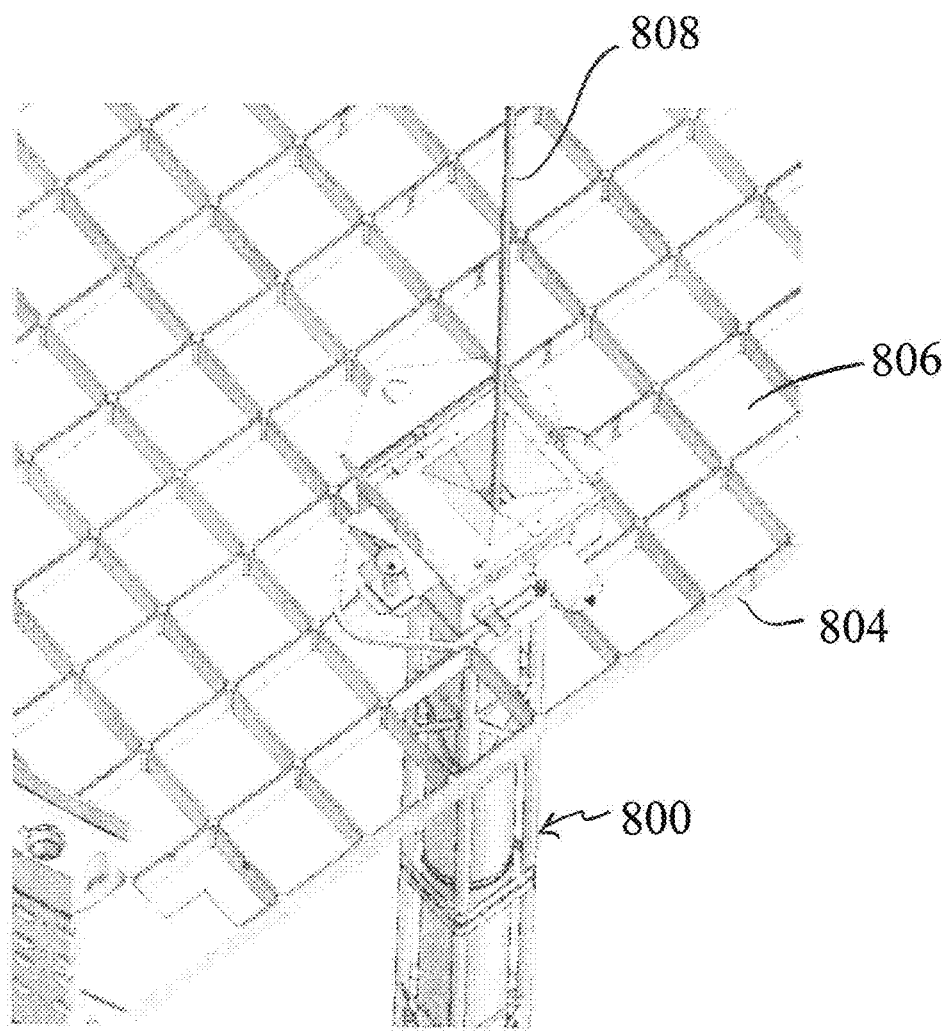
FIG. 8C is a perspective view of the upper portion of the fully assembled system of FIG. 8A installed in top guide of the nuclear reactor, with part of a radioactive component within the device of FIG. 7A and/or the receptacle of FIG. 5A.
Figure 8D:
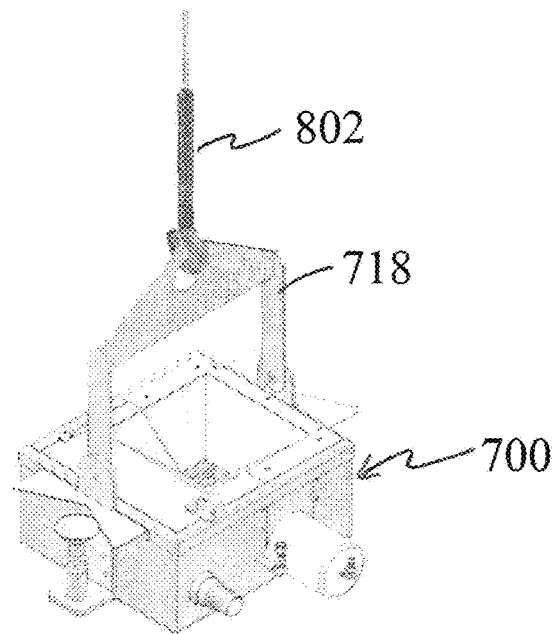
FIG. 8D is a perspective view of the device of FIG. 7A being removed from the frame of FIG. 6A.
Figure 8D:
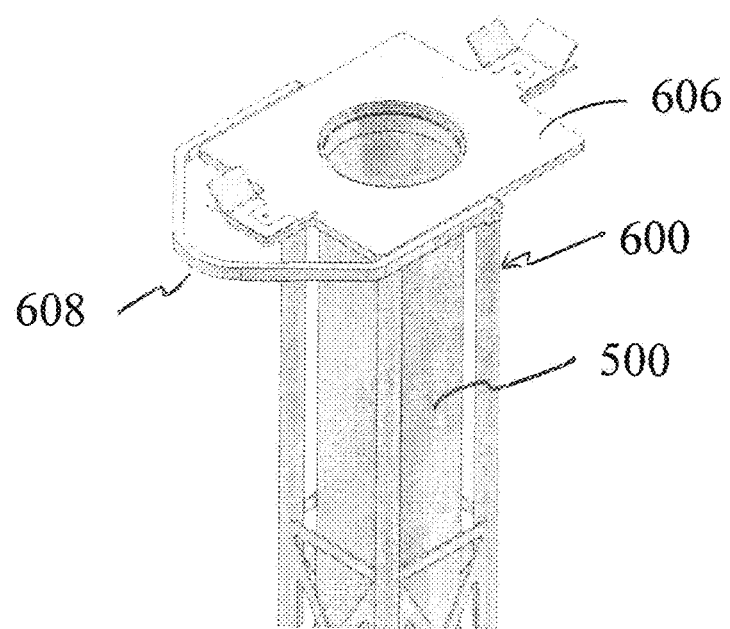
Figure 8E:
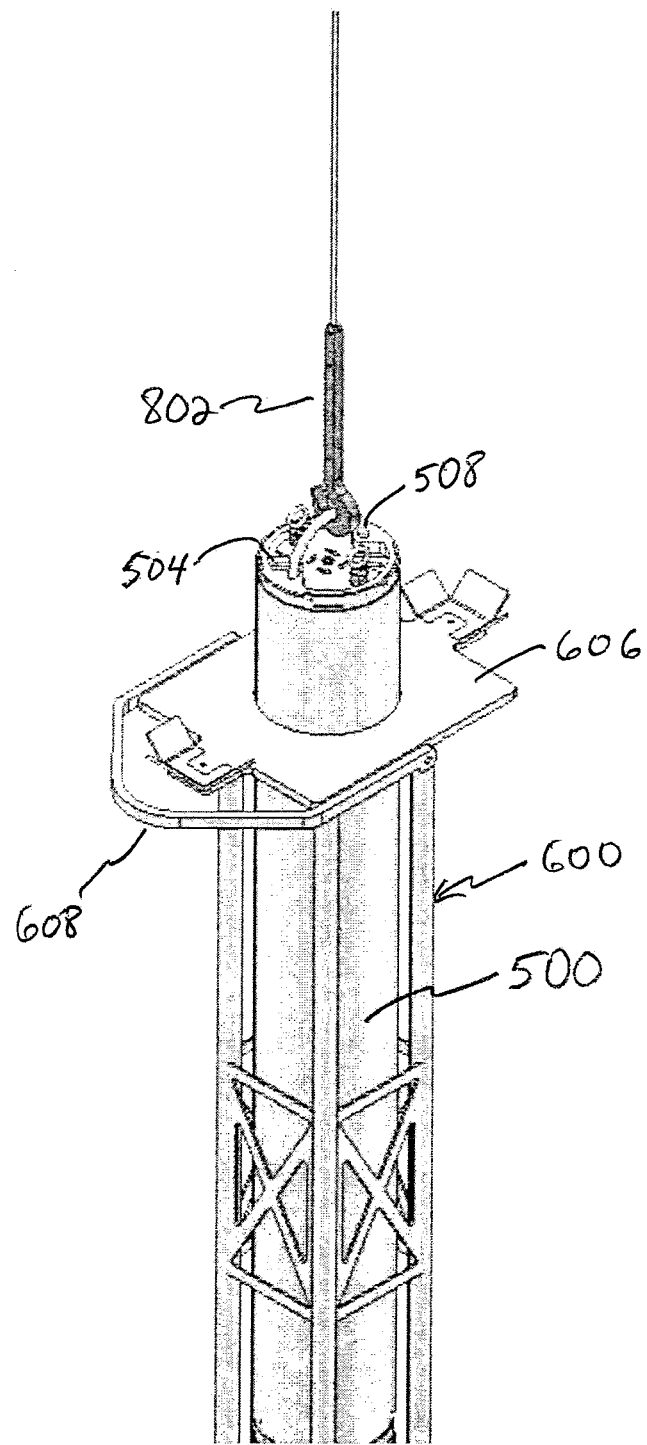
FIG. 8E is a perspective view of the receptacle of FIG. 5A being removed from the frame of FIG. 6A.

FIG. 8A is a perspective view of an upper portion of fully assembled system 800, with handling tool 802 attached to lifting handle 718; FIG. 8B is a perspective view of the upper portion of fully assembled system 800, with handling tool 802 attached to lifting handle 718, being installed in or withdrawn from top guide 804 of the nuclear reactor using handling tool 802 and lifting handle 718; FIG. 8C is a perspective view of the upper portion of fully assembled system 800 installed in top guide 804 of the nuclear reactor, with part of radioactive component 808 within device 700 and/or receptacle 500; FIG. 8D is a perspective view of device 700 being removed from frame 600, with handling tool 802 attached to lifting handle 718; FIG. 8E is a perspective view of receptacle 500 being removed from frame 600, with handling tool 802 attached to first lifting point 508.

System 800 may comprise receptacle 500, frame 600, and/or device 700. Full assembly of system 800 may be done away from an area of the reactor core of the nuclear reactor, for example, on a set-up stand, followed by installation of the fully assembled system 800. For example, fully assembled system 800 may be installed in top guide 804 (e.g., into empty fuel cell 806) of the nuclear reactor using handling tool 802 and lifting handle 718. Full assembly of system 800 on a set-up stand would allow system 800 to be thoroughly tested prior to installation, as would be understood by a PHOSITA.

In the alternative, partial assembly of system 800 may be done away from an area of the reactor core of the nuclear reactor, for example, on a set-up stand, followed by installation of the partially assembled system 800. In this case, at least some of the assembly of system 800 may occur in the area of the reactor core of the nuclear reactor, for example, through and/or around top guide 804 of the nuclear reactor. For example, frame 600 may be installed in top guide 804 using handling tool 802 and lifting handle 608, then receptacle 500 may be installed in frame 600 using handling tool 802 and first lifting point 508, and finally device 700 may be operatively connected to (e.g., mounted on) platform 606 using handling tool 802 and lifting handle 718. Based upon the present application, various combinations of this partial assembly and installation are possible, as would be understood by a PHOSITA.

As would be understood by a PHOSITA, much of the work done by operators of the nuclear reactor may be carried out from a refuel bridge (e.g., a primary work platform that spans the reactor vessel). For example, the refuel bridge may be the location of controls for handling tool 802, associated hoisting mechanisms, and/or associated electrical, pneumatic, and/or hydraulic systems.

Although fully assembled system 800 may be moved to and installed in top guide 804 of the nuclear reactor, the extent of assembly at a given location may depend on factors such as the weights of receptacle 500, frame 600, and/or device 700, and constraints on handling tool 802 and/or associated hoisting mechanisms, as would be understood by a PHOSITA.

Although FIG. 8B appears to show no empty fuel cells 806 in top guide 804, a PHOSITA would understand that system 800 may be used when the reactor is shutdown as soon as a first fuel cell movement and/or fuel cell shuffle is complete. In some example embodiments, use of system 800 may require only a single empty fuel cell 806.

During use of device 700 to separate a radioactive component into two or more portions, the radioactive component may be withdrawn from an operative position in the nuclear reactor by handling tool 802 and/or associated hoisting mechanisms, moved to device 700 while suspended from handling tool 802, and/or lowered into device 700 and/or receptacle 500 while suspended from handling tool 802 (FIG. 8C, for example, is a perspective view of the upper portion of fully assembled system 800 installed in top guide 804 of the nuclear reactor, with part of radioactive component 808 within device 700 and/or receptacle 500—the radioactive component may be moving into device 700 and/or receptacle 500 at the time, moving out of device 700 and/or receptacle 500 at the time, or not moving into or out of device 700 and/or receptacle 500 at the time), as would be understood by a PHOSITA. After use of device 700 to separate a radioactive component into two or more portions, any remaining portion of the radioactive component may be released by handling tool 802 so that the remaining portion stays in receptacle 500, as would be understood by a PHOSITA.

In some example embodiments, system 800 may comprise a second receptacle (not shown) configured to receive the one or more radioactive components. The second receptacle may comprise internal subdivisions configured to facilitate organization of the two or more portions in a manner similar to that for receptacle 500. Frame 600 may be configured to the second receptacle in a manner similar to that for receptacle 500.

System 800 may be configured to allow replacement of receptacle 500 by the second receptacle without removing frame 600 from an area of a reactor core of the nuclear reactor. System 800 may be configured to allow replacement of receptacle 500 by the second receptacle when device 700 is not operatively connected to (e.g., mounted on) frame 600.

In some example embodiments, when receptacle 500 is as full as it is to be filled, receptacle 500 may be removed from the area of top guide 804 in order to remove of the two or more portions in receptacle 500 from the area of the reactor core of the nuclear reactor.

In some example embodiments, the removing of the two or more portions in receptacle 500 from the area of the reactor core of the nuclear reactor may comprise removing fully assembled system 800 from the area of the reactor core of the nuclear reactor. Once system 800 is removed from the area of the reactor core of the nuclear reactor, device 700 may allow access by handling tool 802 to receptacle 500, which then may be sealed by lid 504. Once receptacle 500 is sealed, handling tool 802 may access first lifting point 508 of receptacle 500 to remove receptacle 500 from frame 600.

In some example embodiments, the removing of the two or more portions in receptacle 500 from the area of the reactor core of the nuclear reactor may comprise disassembling at least part of system 800 before removing receptacle 500 from the area of the reactor core of the nuclear reactor (FIG. 8D, for example, is a perspective view of device 700 being removed from frame 600, with handling tool 802 attached to lifting handle 718). For example, removing device 700 may allow access by handling tool 802 to receptacle 500, which then may be sealed by lid 504. Once receptacle 500 is sealed, handling tool 802 may access first lifting point 508 of receptacle 500 to remove receptacle 500 from frame 600 while frame 600 remains in top guide 804 (FIG. 8E, for example, is a perspective view of receptacle 500 being removed from frame 600, with handling tool 802 attached to first lifting point 508).

Sealed receptacle 500 may be loaded into a storage cask for radioactive material. The storage cask may be closed and removed from the nuclear reactor or nuclear plant for temporary or long-term storage, as would be understood by a PHOSITA.

Figure 9:
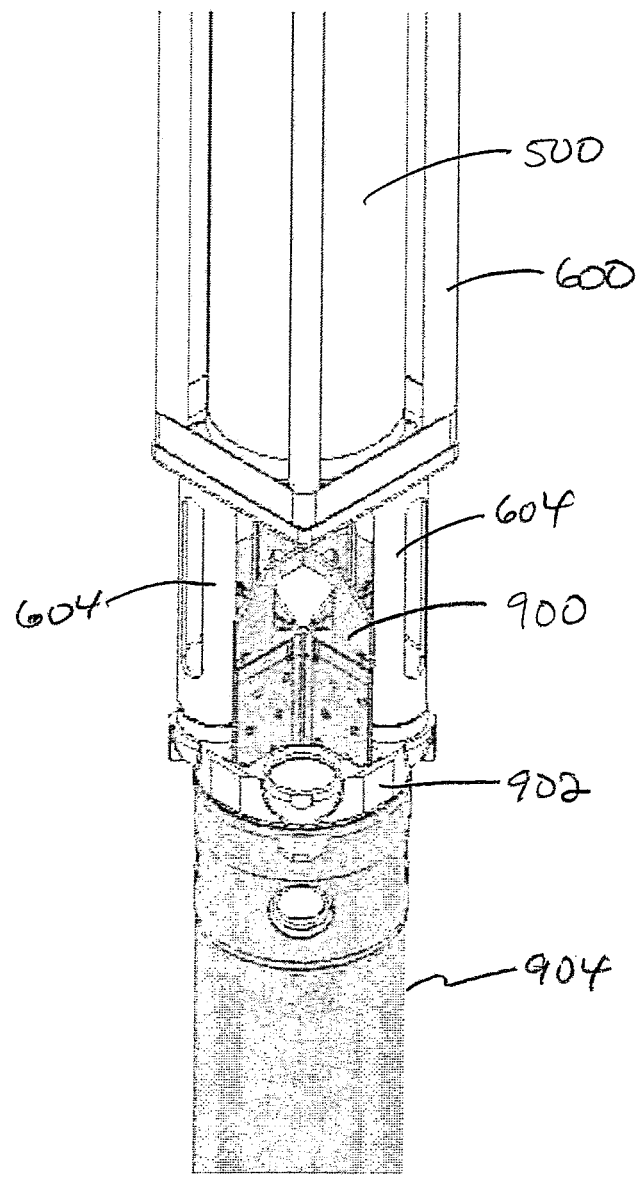
FIG. 9 is a perspective view of the receptacle of FIG. 5A, the frame of FIG. 6A, a control rod blade, a fuel support, and a guide tube according to some example embodiments.

FIG. 9 is a perspective view of receptacle 500, frame 600, control rod blade 900, fuel support 902, and guide tube 904 according to some example embodiments.

In some example embodiments, frame 600 may be configured to vertically and/or horizontally support receptacle 500 in the nuclear reactor by using fuel support 902. In some example embodiments, frame 600 may be configured to vertically and/or horizontally support device 700 in the nuclear reactor by using fuel support 902. In some example embodiments, frame 600 may be configured to vertically and/or horizontally support receptacle 500 and device 700 in the nuclear reactor by using fuel support 902. Frame 600 may transfer forces (e.g., weight, impact, lateral, rotational, torsional) to fuel support 902.

In some example embodiments, frame 600 may be configured to vertically and/or horizontally support receptacle 500 in the nuclear reactor by using top guide 804. In some example embodiments, frame 600 may be configured to vertically and/or horizontally support device 700 in the nuclear reactor by using top guide 804. In some example embodiments, frame 600 may be configured to vertically and/or horizontally support receptacle 500 and device 700 in the nuclear reactor by using top guide 804. Frame 600 may transfer forces (e.g., weight, impact, lateral, rotational, torsional) to top guide 804.

Figure 10:
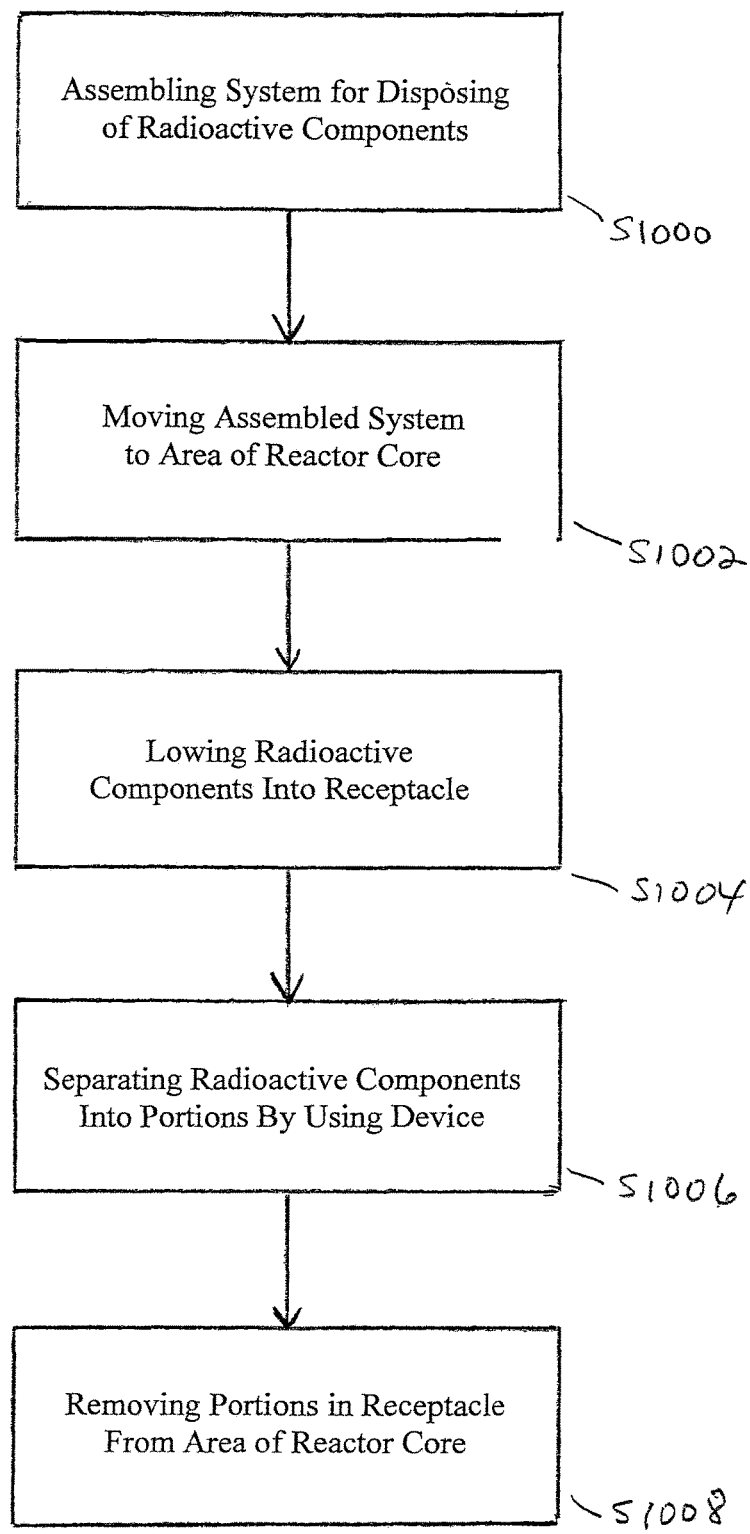
FIG. 10 is a flowchart of a first method for disposing of one or more radioactive components from a nuclear reactor of a nuclear plant according to some example embodiments.

FIG. 10 is a flowchart of a first method for disposing of one or more radioactive components from a nuclear reactor of a nuclear plant according to some example embodiments.

In some example embodiments, a method for disposing of one or more radioactive components from a nuclear reactor of a nuclear plant may comprise assembling a system for disposing of the one or more radioactive components, the system comprising a first receptacle configured to receive the one or more radioactive components, a frame configured to support the first receptacle in the nuclear reactor, and a device configured to separate the one or more radioactive components into two or more portions; moving the assembled system to an area of a reactor core of the nuclear reactor; lowering the one or more radioactive components into the first receptacle; separating the one or more radioactive components into the two or more portions by using the device; and/or removing the two or more portions in the first receptacle from the area of the reactor core of the nuclear reactor.

As shown in S1000 of FIG. 10, system 800 for disposing of one or more radioactive components may be assembled. System 800 may comprise receptacle 500 configured to receive the one or more radioactive components, frame 600 configured to support receptacle 500 in the nuclear reactor, and device 700 configured to separate the one or more radioactive components into two or more portions.

As shown in S1002 of FIG. 10, system 800 may be moved to an area of a reactor core of the nuclear reactor.

As shown in S1004 of FIG. 10, the one or more radioactive components may be lowered into receptacle 500.

As shown in S1006 of FIG. 10, the one or more radioactive components may be separated into the two or more portions using device 700.

As shown in S1008 of FIG. 10, the two or more portions in receptacle 500 may be removed from the area of the reactor core of the nuclear reactor.

In some example embodiments, the lowering of the one or more radioactive components into receptacle 500 and the separating of the one or more radioactive components by using device 700 may be repeated as required to separate the one or more radioactive components into the two or more portions.

In some example embodiments, the removing of the two or more portions in receptacle 500 from the area of the reactor core of the nuclear reactor may comprise removing assembled system 800 from the area of the reactor core of the nuclear reactor.

In some example embodiments, the method for disposing of one or more radioactive components from the nuclear reactor of the nuclear plant may further comprise disassembling at least part of assembled system 800 before removing the two or more portions in receptacle 500 from the area of the reactor core of the nuclear reactor.

In some example embodiments, the method for disposing of one or more radioactive components from the nuclear reactor of the nuclear plant may further comprise sealing receptacle 500 before removing the two or more portions in receptacle 500 from the area of the reactor core of the nuclear reactor.

Figure 11:
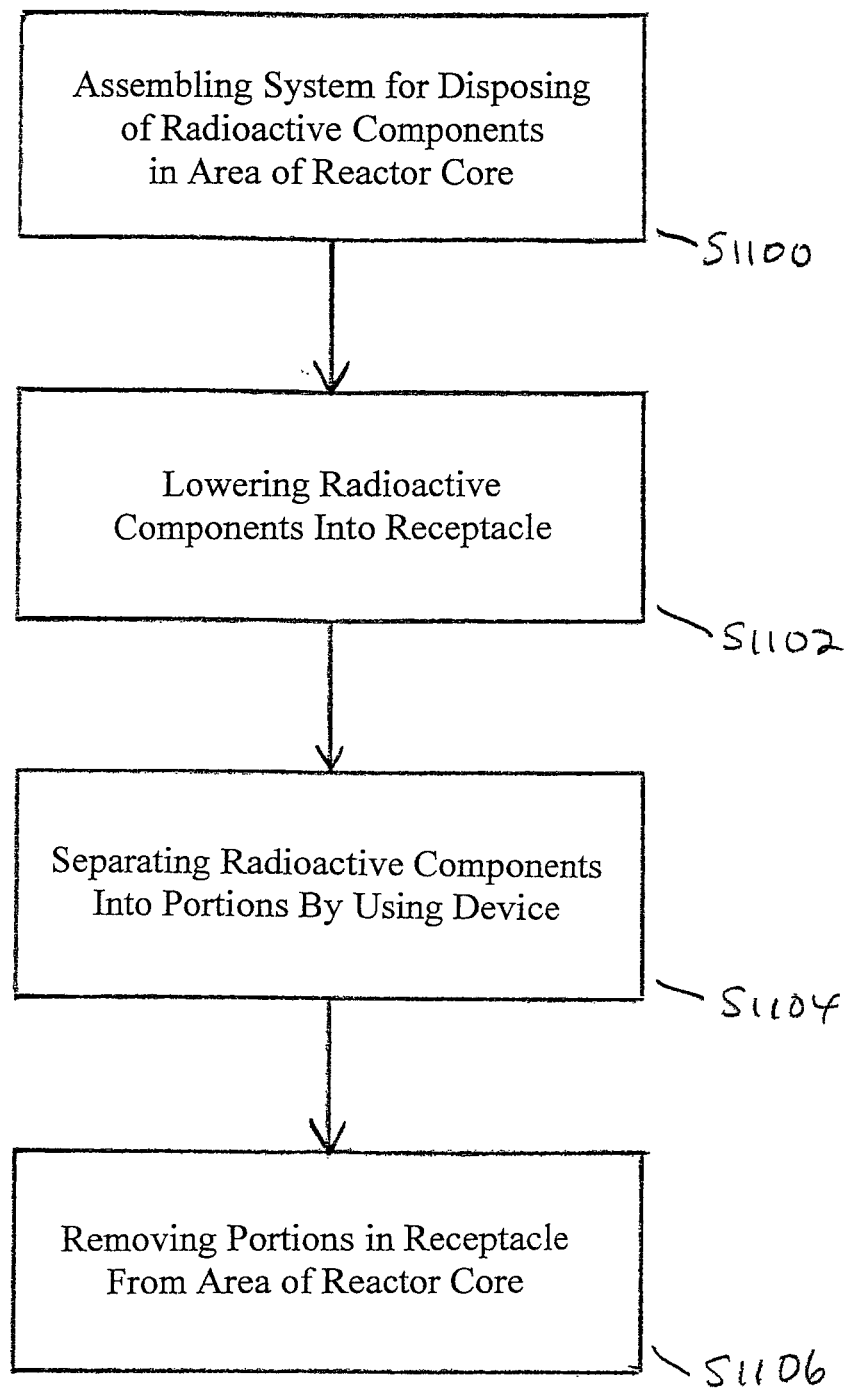
FIG. 11 is a flowchart of a second method for disposing of one or more radioactive components from a nuclear reactor of a nuclear plant according to some example embodiments.

FIG. 11 is a flowchart of a second method for disposing of one or more radioactive components from a nuclear reactor of a nuclear plant according to some example embodiments.

In some example embodiments, a method for disposing of one or more radioactive components from a nuclear reactor of a nuclear plant may comprise at least partly assembling a system for disposing of the one or more radioactive components in an area of a reactor core of the nuclear reactor, the system comprising a first receptacle configured to receive the one or more radioactive components, a frame configured to support the first receptacle in the nuclear reactor, and a device configured to separate the one or more radioactive components into two or more portions; lowering the one or more radioactive components into the first receptacle; separating the one or more radioactive components into the two or more portions by using the device; and/or removing the two or more portions in the first receptacle from the area of the reactor core of the nuclear reactor.

As shown in S1100 of FIG. 11, system 800 for disposing of one or more radioactive components may be at least partly assembled in an area of a reactor core of the nuclear reactor.

System 800 may comprise receptacle 500 configured to receive the one or more radioactive components, frame 600 configured to support receptacle 500 in the nuclear reactor, and device 700 configured to separate the one or more radioactive components into two or more portions.

As shown in S1102 of FIG. 11, the one or more radioactive components may be lowered into receptacle 500.

As shown in S1104 of FIG. 11, the one or more radioactive components may be separated into the two or more portions by using device 700.

As shown in S1106 of FIG. 10, the two or more portions in receptacle 500 may be removed from the area of the reactor core of the nuclear reactor.

In some example embodiments, the lowering of the one or more radioactive components into receptacle 500 and the separating of the one or more radioactive components by using device 700 may be repeated as required to separate the one or more radioactive components into the two or more portions.

In some example embodiments, the removing of the two or more portions in receptacle 500 from the area of the reactor core of the nuclear reactor may comprise removing assembled system 800 from the area of the reactor core of the nuclear reactor. In some example embodiments, a path for the removing of the two or more portions may include an inclined fuel transfer system (IFTS). As would be understood by a PHOSITA, an IFTS may comprise, for example, a tube with pressure-tight hatches on each end of the tube, a carriage for shuttling items within the tube, and/or a device to tilt the carriage to fit into the tube. As would be understood by a PHOSITA, an IFTS may be used, for example, when fuel storage pools are located in a building separate from the primary containment building, typically at a lower elevation.

In some example embodiments, the method for disposing of one or more radioactive components from the nuclear reactor of the nuclear plant may further comprise disassembling at least part of assembled system 800 before removing the two or more portions in receptacle 500 from the area of the reactor core of the nuclear reactor.

In some example embodiments, the method for disposing of one or more radioactive components from the nuclear reactor of the nuclear plant may further comprise sealing receptacle 500 before removing the two or more portions in receptacle 500 from the area of the reactor core of the nuclear reactor.

Example embodiments of the systems and methods for disposing of one or more radioactive components from a nuclear reactor of a nuclear plant should provide one or more advantages over conventional art systems and methods, including simpler disposal of radioactive components, more effective disposal of radioactive components, more efficient disposal of radioactive components, reduced personnel requirements, reduced man-hours, reduced personnel radiation exposure, removal of disposal of radioactive components from critical path for outage, and reduced outage time.

While example embodiments have been particularly shown and described, it will be understood by those of ordinary skill in the art that various changes in form and details may be made therein without departing from the spirit and scope of the present invention as defined by the following claims.

What is claimed is:

1. A system for disposing of one or more radioactive components from a nuclear reactor of a nuclear plant, the system comprising:
   a first receptacle configured to receive the one or more radioactive components;
   a frame configured to support the first receptacle in the nuclear reactor, the frame including framework extending between opposite ends of the frame, the framework at least partially defining an interior space of the frame, the frame configured to support the first receptacle within the interior space at least partially defined by the framework; and
   a device configured to separate the one or more radioactive components into two or more portions during lowering of the one or more radioactive components into the first receptacle, the device including a cutter configured to separate the one or more radioactive components into two or more portions;
   wherein the device comprises a guide configured to assist in lowering the one or more radioactive components through the device and into the first receptacle, the guide including an inclined surface extending along a longitudinal axis of the first receptacle, the inclined surface configured to be permanently fixed in relation to the frame during the separating, the guide configured to be distal from the first receptacle in relation to the cutter, such that the inclined surface is configured to direct the one or more radioactive components towards the cutter.

2. The system of claim 1, wherein the one or more radioactive components comprise core instrumentation.

3. The system of claim 1, wherein the frame is configured to vertically support the first receptacle in the nuclear reactor by using a fuel support of the nuclear reactor.

4. The system of claim 1, wherein the frame is configured to vertically support the device in the nuclear reactor by using a fuel support of the nuclear reactor.

5. The system of claim 1, wherein the frame is configured to horizontally support the first receptacle in the nuclear reactor by using a top guide of the nuclear reactor.

6. The system of claim 1, wherein the frame is configured to horizontally support the device in the nuclear reactor by using a top guide of the nuclear reactor.

7. The system of claim 1, wherein when the device separates the one or more radioactive components into the two or more portions, the device is operatively connected to the frame.

8. The system of claim 1, further comprising:
   a second receptacle configured to receive the one or more radioactive components;
   wherein the frame is further configured to support the second receptacle in the nuclear reactor by using a fuel support of the nuclear reactor, a top guide of the nuclear reactor, or the fuel support and the top guide of the nuclear reactor, and wherein the system is configured to allow replacement of the first receptacle by the second receptacle without removing the frame from an area of a reactor core of the nuclear reactor.

9. The system of claim 8, wherein the system is further configured to allow replacement of the first receptacle by the second receptacle when the device is not operatively connected to the frame.

10. The system of claim 1, wherein the first receptacle comprises internal subdivisions configured to facilitate organization of the two or more portions.

11. A method for disposing of one or more radioactive components from a nuclear reactor of a nuclear plant, the method comprising:

assembling a system for disposing of the one or more radioactive components, the system comprising a first receptacle configured to receive the one or more radioactive components, a frame configured to support the first receptacle in the nuclear reactor, and a device configured to separate the one or more radioactive components into two or more portions, the device including a cutter configured to separate the one or more radioactive components into two or more portions, wherein the device comprises a guide configured to assist in lowering the one or more radioactive components through the device and into the first receptacle, the frame including framework extending between opposite ends of the frame, the framework at least partially defining an interior space of the frame, the frame configured to support the first receptacle within the interior space at least partially defined by the framework, the guide including an inclined surface extending along a longitudinal axis of the first receptacle, the inclined surface configured to be permanently fixed in relation to the frame during the separating, the guide configured to be distal from the first receptacle in relation to the cutter, such that the inclined surface is configured to direct the one or more radioactive components towards the cutter;

moving the assembled system to an area of a reactor core of the nuclear reactor;

lowering the one or more radioactive components through the device and into the first receptacle;

separating the one or more radioactive components into the two or more portions by using the device; and removing the two or more portions in the first receptacle from the area of the reactor core of the nuclear reactor.

12. The method of claim 11, wherein the lowering of the one or more radioactive components through the device and into the first receptacle and the separating of the one or more radioactive components by using the device are repeated as required to separate the one or more radioactive components into the two or more portions.

13. The method of claim 11, wherein the removing of the two or more portions in the first receptacle from the area of the reactor core of the nuclear reactor comprises removing the assembled system from the area of the reactor core of the nuclear reactor.

14. The method of claim 11, further comprising:

disassembling at least part of the assembled system before removing the two or more portions in the first receptacle from the area of the reactor core of the nuclear reactor.

15. The method of claim 11, further comprising:

sealing the first receptacle before removing the two or more portions in the first receptacle from the area of the reactor core of the nuclear reactor.

16. A method for disposing of one or more radioactive components from a nuclear reactor of a nuclear plant, the method comprising:

at least partly assembling a system for disposing of the one or more radioactive components in an area of a reactor core of the nuclear reactor, the system comprising a first receptacle configured to receive the one or more radioactive components, a frame configured to support the first receptacle in the nuclear reactor, and a device configured to separate the one or more radioactive components into two or more portions, the device including a cutter configured to separate the one or more radioactive components into two or more portions, wherein the device comprises a guide configured to assist in lowering the one or more radioactive components through the device and into the first receptacle, the frame including framework extending between opposite ends of the frame, the framework at least partially defining an interior space of the frame, the frame configured to support the first receptacle within the interior space at least partially defined by the framework, the guide including an inclined surface extending along a longitudinal axis of the first receptacle, the inclined surface configured to be permanently fixed in relation to the frame during the separating, the guide configured to be distal from the first receptacle in relation to the cutter, such that the inclined surface is configured to direct the one or more radioactive components towards the cutter;

lowering the one or more radioactive components through the device and into the first receptacle;

separating the one or more radioactive components into the two or more portions by using the device; and removing the two or more portions in the first receptacle from the area of the reactor core of the nuclear reactor.

17. The method of claim 16, wherein the lowering of the one or more radioactive components through the device and into the first receptacle and the separating of the one or more radioactive components by using the device are repeated as required to separate the one or more radioactive components into the two or more portions.

18. The method of claim 16, wherein the removing of the two or more portions in the first receptacle from the area of the reactor core of the nuclear reactor comprises removing the assembled system from the area of the reactor core of the nuclear reactor.

19. The method of claim 16, further comprising:

disassembling at least part of the assembled system before removing the two or more portions in the first receptacle from the area of the reactor core of the nuclear reactor.

20. The method of claim 16, further comprising:

sealing the first receptacle before removing the two or more portions in the first receptacle from the area of the reactor core of the nuclear reactor.

21. A system for disposing of one or more rigid radioactive components from a nuclear reactor of a nuclear plant, the system comprising:

a first receptacle configured to receive the one or more rigid radioactive components;

a frame configured to support the first receptacle in the nuclear reactor, the frame including framework extending between opposite ends of the frame, the framework at least partially defining an interior space of the frame, the frame configured to support the first receptacle within the interior space at least partially defined by the framework; and a device configured to separate the one or more rigid radioactive components into two or more portions during lowering of the one or more rigid radioactive components into the first receptacle, the device including a cutter configured to separate the one or more rigid radioactive components into two or more portions;

wherein the device comprises a guide having at least one inclined surface configured to engage an end of the one or more rigid radioactive components to assist with aligning and insertion of the one or more rigid radioactive components into the device during the lowering of the one or more rigid radioactive components, the guide configured to be distal from the first receptacle in relation to the cutter, such that the at least one inclined surface is configured to at least partially align the one or more rigid radioactive components towards the cutter.

* * * * *